(12) United States Patent
Sueyoshi et al.

(10) Patent No.: US 11,190,937 B2
(45) Date of Patent: Nov. 30, 2021

(54) INFORMATION PROCESSING DEVICE AND INFORMATION PROCESSING METHOD

(71) Applicant: SONY CORPORATION, Tokyo (JP)

(72) Inventors: Masahiro Sueyoshi, Kanagawa (JP); Tomohiko Nagayama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/876,842

(22) Filed: May 18, 2020

(65) Prior Publication Data
US 2020/0280832 A1 Sep. 3, 2020

Related U.S. Application Data

(63) Continuation of application No. 15/768,155, filed as application No. PCT/JP2016/077005 on Sep. 13, 2016, now Pat. No. 10,674,339.

(51) Int. Cl.
*H04B 5/00* (2006.01)
*H04W 12/069* (2021.01)
(Continued)

(52) U.S. Cl.
CPC ............ *H04W 12/069* (2021.01); *H04B 5/02* (2013.01); *H04W 4/00* (2013.01); *H04W 4/80* (2018.02);
(Continued)

(58) Field of Classification Search
CPC ....... H04W 12/069; H04W 4/80; H04W 4/00; H04W 12/06; H04W 84/10; H04W 84/12; H04B 5/02
(Continued)

(56) References Cited

U.S. PATENT DOCUMENTS 8,739,263 B2 * 5/2014 Azuma ................. G06F 21/629
726/9
9,031,545 B1 * 5/2015 Srey ....................... B60K 28/02
455/418
(Continued)

FOREIGN PATENT DOCUMENTS

CN          1572087 A      1/2005
CN        102667655 A      9/2012
(Continued)

OTHER PUBLICATIONS

Non-Final Office Action for U.S. Appl. No. 15/768,155, dated Nov. 2, 2018, 14 pages.
(Continued)

*Primary Examiner* — April G Gonzales
(74) *Attorney, Agent, or Firm* — Chip Law Group

(57) ABSTRACT

There is provided an information processing device including a processing unit that authenticates a communication target device on a basis of predetermined information transmitted from the communication target device by broadcast in communication in a first communication scheme, the predetermined information being used in a process to be performed in communication in a second communication scheme that is different from the first communication scheme, and establishes the communication with the communication target device in the first communication scheme in a case in which authentication is completed.

13 Claims, 14 Drawing Sheets

(51) Int. Cl.
- *H04B 5/02* (2006.01)
- *H04W 84/10* (2009.01)
- *H04W 4/00* (2018.01)
- *H04W 84/12* (2009.01)
- *H04W 12/06* (2021.01)
- *H04W 4/80* (2018.01)

(52) U.S. Cl.
CPC .......... *H04W 12/06* (2013.01); *H04W 84/10* (2013.01); *H04W 84/12* (2013.01)

(58) Field of Classification Search
USPC ....................................................... 455/41.2
See application file for complete search history.

(56) References Cited

U.S. PATENT DOCUMENTS

| | | | | |
|---|---|---|---|---|
| 9,265,080 | B1* | 2/2016 | Palin | H04W 8/005 |
| 9,385,870 | B2* | 7/2016 | Ylimartimo | G06F 21/44 |
| 9,454,786 | B1* | 9/2016 | Srey | G06Q 30/0283 |
| 9,608,739 | B2* | 3/2017 | Nagara | H04W 76/15 |
| 9,658,805 | B2* | 5/2017 | Otake | H04L 63/08 |
| 2004/0242250 | A1* | 12/2004 | Sasai | H04W 8/005 |
| | | | | 455/502 |
| 2006/0206916 | A1* | 9/2006 | Maeda | H04N 21/426 |
| | | | | 725/151 |
| 2006/0206917 | A1* | 9/2006 | Maeda | H04N 7/163 |
| | | | | 725/151 |
| 2009/0052348 | A1 | 2/2009 | Kato et al. | |
| 2011/0112969 | A1 | 5/2011 | Zaid et al. | |
| 2012/0250577 | A1* | 10/2012 | Kimura | H04W 4/50 |
| | | | | 370/254 |
| 2012/0254614 | A1* | 10/2012 | Kimura | H04W 12/04 |
| | | | | 713/168 |
| 2012/0282860 | A1* | 11/2012 | Sasai | H04W 4/80 |
| | | | | 455/41.3 |
| 2014/0308898 | A1* | 10/2014 | Lee | H04W 4/80 |
| | | | | 455/41.3 |
| 2014/0365671 | A1* | 12/2014 | Petersen | H04L 67/16 |
| | | | | 709/227 |
| 2015/0106901 | A1* | 4/2015 | Suzuki | G06F 21/33 |
| | | | | 726/7 |
| 2015/0126125 | A1* | 5/2015 | Sasai | H04W 76/14 |
| | | | | 455/41.2 |
| 2015/0289124 | A1* | 10/2015 | Palin | H04W 4/80 |
| | | | | 455/41.2 |
| 2015/0312839 | A1* | 10/2015 | Trehan | H04W 76/14 |
| | | | | 370/338 |
| 2016/0006709 | A1* | 1/2016 | Sakurai | H04L 63/08 |
| | | | | 726/6 |
| 2016/0148270 | A1* | 5/2016 | Vigier | G06Q 30/0261 |
| | | | | 705/14.58 |
| 2016/0150537 | A1* | 5/2016 | Jung | H04W 8/005 |
| | | | | 455/452.1 |

FOREIGN PATENT DOCUMENTS

| | | |
|---|---|---|
| CN | 104155938 A | 11/2014 |
| EP | 2026615 A2 | 2/2009 |
| JP | 2009-135865 A | 6/2009 |
| JP | 2013-509640 A | 3/2013 |
| JP | 2015-059396 A | 3/2015 |
| WO | 2011/053357 A1 | 5/2011 |
| WO | 2015/064020 A1 | 5/2015 |

OTHER PUBLICATIONS

Final Office Action for U.S. Appl. No. 15/768,155, dated May 30, 2019, 17 pages.

Advisory Action for U.S. Appl. No. 15/768,155, dated Aug. 15, 2019, 3 pages.

Notice of Allowance for U.S. Appl. No. 15/768,155, dated Feb. 4, 2020, 10 pages.

International Search Report and Written Opinion of PCT Application No. PCT/JP2016/077005, dated Oct. 18, 2016, 7 pages of English Translation and 6 pages of ISRWO.

International Preliminary Report on Patentability of PCT Application No. PCT/JP2016/077005, dated May 11, 2018, 7 pages of English Translation and 4 pages of IPRP.

Office Action for CN Patent Application No. 201680060885 dated Oct. 26, 2020.

\* cited by examiner

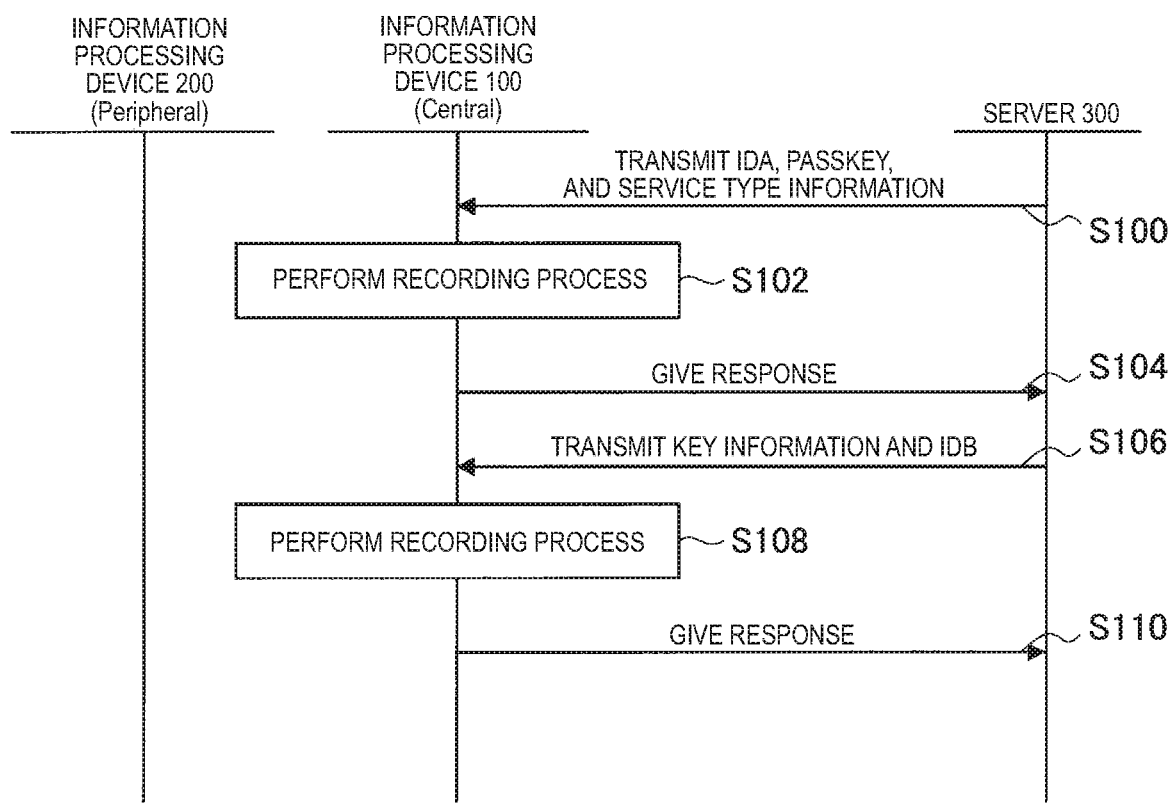

FIG. 13

| Header | BTA(6B) | Number (1B) | SRV1(2B) | SRV2(2B) | . . . | Padding | Trailer |

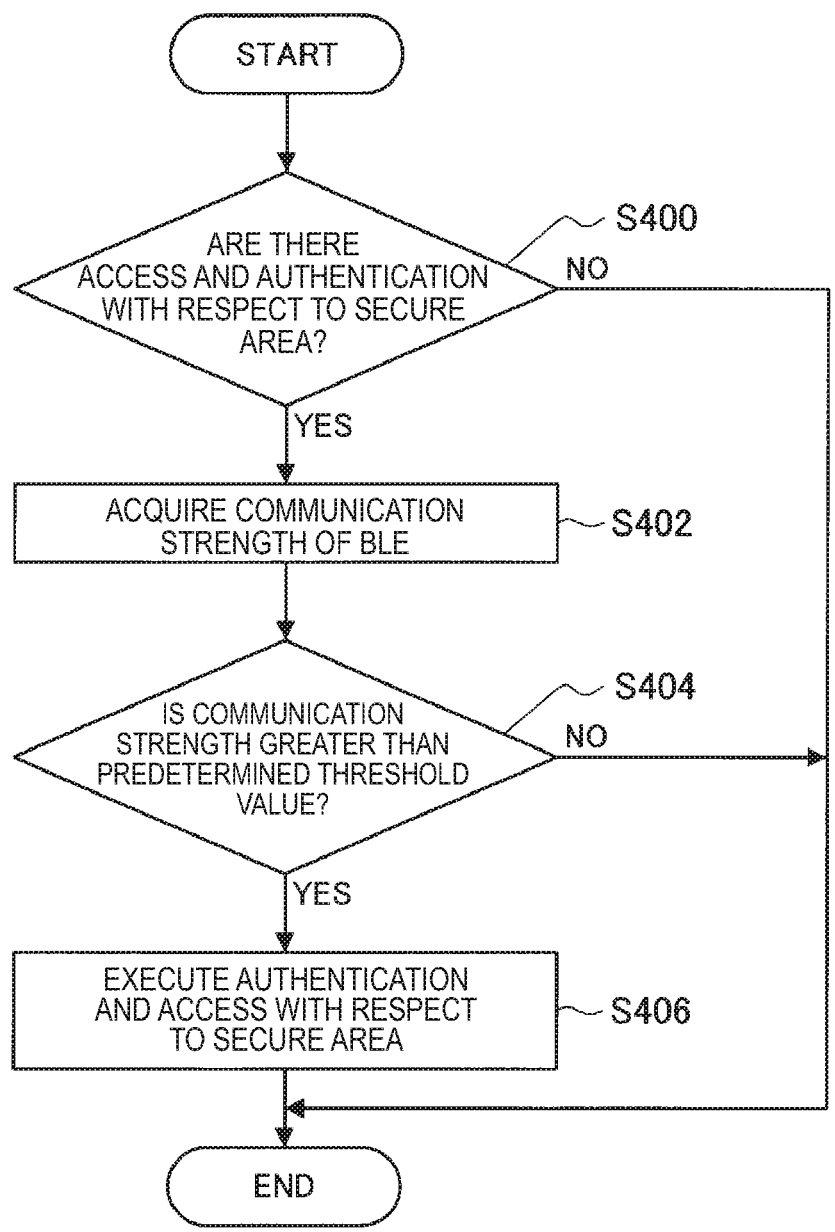

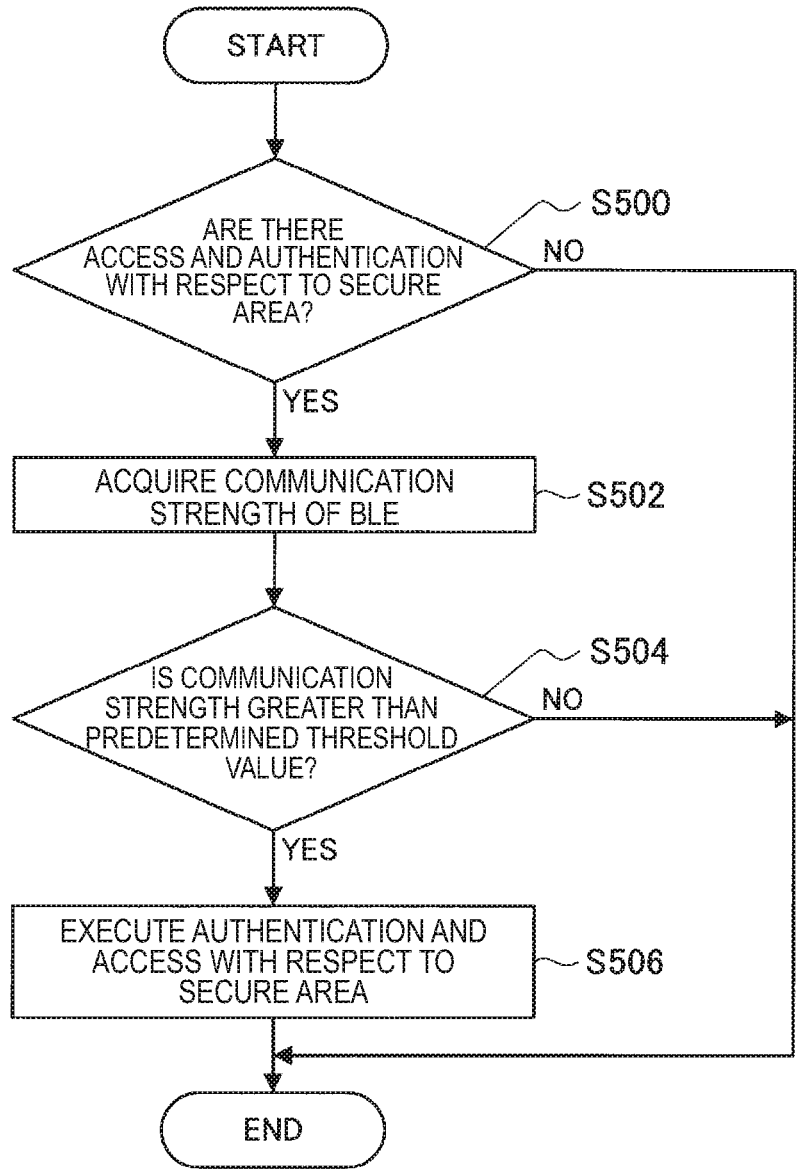

INFORMATION PROCESSING DEVICE AND INFORMATION PROCESSING METHOD

CROSS REFERENCE TO RELATED APPLICATIONS

The present application is a continuation application of U.S. patent application Ser. No. 15/768,155, filed on Apr. 13, 2018, which is a National Stage Entry of Patent Application No. PCT/JP2016/077005, filed on Sep. 13, 2016, which claims priority from Japanese Patent Application No. JP 2015-210981 filed in the Japan Patent Office on Oct. 27, 2015, the entire content of which is hereby incorporated by reference.

TECHNICAL FIELD

The present disclosure relates to an information processing device, an information processing method, and a program.

BACKGROUND ART

Technologies for performing communication by switching two different communication schemes have been developed. As a "technology in which, after transmission of data to another device is started using a first communication scheme that is proximity wireless communication not requiring authentication, data is transmitted by switching to a second communication scheme that has a longer communicable distance than the proximity wireless communication," for example, the technology described in Patent Literature 1 mentioned below is exemplified.

CITATION LIST

Patent Literature

Patent Literature 1:
JP 2012-80289A

DISCLOSURE OF INVENTION

Technical Problem

In a case in which an existing technology for performing communication by switching between different communication schemes, for example, such as the technology described in Patent Literature 1, is being used and devices are performing proximity wireless communication, the communication between the devices is switched to another communication scheme that has a longer communicable distance than the proximity wireless communication. However, if communication is not performed using the proximity wireless communication in a case in which the existing technology as described above is being used, a communication scheme is not switched to another communication scheme that has a longer communicable distance than the proximity wireless communication.

The present disclosure proposes a novel and improved information processing device, information processing method, and program that enable a communication target device to be authenticated using a combination of different communication schemes and enable communication with the communication target device in one communication scheme to be established.

Solution to Problem

According to the present disclosure, there is provided an information processing device including: a processing unit configured to authenticate a communication target device on a basis of predetermined information transmitted from the communication target device by broadcast in communication in a first communication scheme, the predetermined information being used in a process to be performed in communication in a second communication scheme that is different from the first communication scheme, and establish the communication with the communication target device in the first communication scheme in a case in which authentication is completed.

In addition, according to the present disclosure, there is provided an information processing method executed by an information processing device, the information processing method including: a step of authenticating a communication target device on a basis of predetermined information transmitted from the communication target device by broadcast in communication in a first communication scheme, the predetermined information being used in a process to be performed in communication in a second communication scheme that is different from the first communication scheme, and establishing the communication with the communication target device in the first communication scheme in a case in which authentication is completed.

In addition, according to the present disclosure, there is provided a program for causing a computer to realize a function of authenticating a communication target device on a basis of predetermined information transmitted from the communication target device by broadcast in communication in a first communication scheme, the predetermined information being used in a process to be performed in communication in a second communication scheme that is different from the first communication scheme, and establishing the communication with the communication target device in the first communication scheme in a case in which authentication is completed.

In addition, according to the present disclosure, there is provided an information processing device including: a processing unit configured to determine a state of communication with a communication target device when communication with the communication target device is established and not to perform a process based on a request transmitted from the communication target device on a basis of a determination result.

Advantageous Effects of Invention

According to the present disclosure, a communication target device can be authenticated using a combination of different communication schemes and communication with the communication target device in one communication scheme can be established.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9 is an explanatory diagram illustrating an example of a process relating to a first use case to which the information processing method according to the embodiment can be applied.

FIG. 13 is an explanatory diagram for describing an example of a process relating to the second use case to which the information processing method according to the embodiment can be applied.

FIG. 14 is an explanatory diagram illustrating an example of a process relating to a third use case to which the information processing method according to the embodiment can be applied.

FIG. 15 is an explanatory diagram illustrating an example of a process relating to a fourth use case to which the other information processing method according to the embodiment can be applied.

MODE(S) FOR CARRYING OUT THE INVENTION

Figure 1:
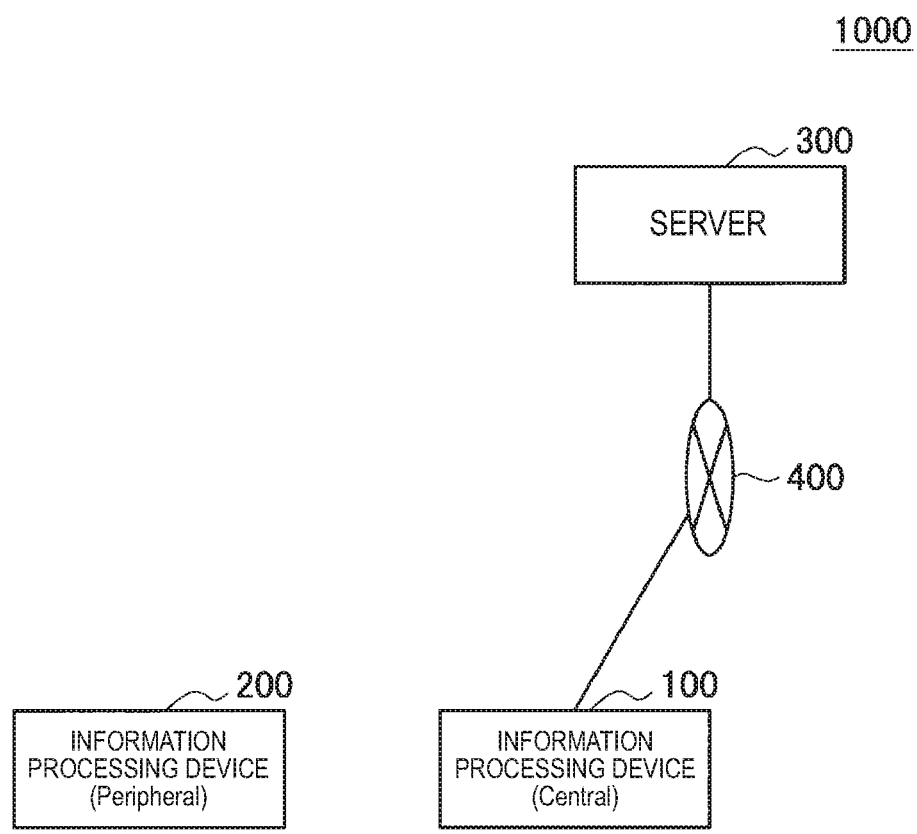
FIG. 1 is an explanatory diagram for describing an information processing method according to an embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be provided below in the following order.

1. Information processing system according to present embodiment and information processing method according to present embodiment 2. Program according to present embodiment (Information processing system according to present embodiment and information processing method according to present embodiment)

An overview of an information processing system according to the present embodiment will be described and an information processing method according to the present embodiment will be described below. In addition, description will be provided on the assumption that an information processing device according to the present embodiment performs a process relating to the information processing method according to the present embodiment.

[1] Overview of Information Processing System According to Present Embodiment

There are devices with a function of performing communication using each of a plurality of different communication schemes. Devices with a function of performing communication using each of at least two different communication schemes, which are a first communication scheme and a second communication scheme that is different from the first communication scheme, will be exemplified below.

As communication in a first communication scheme according to the present embodiment, wireless communication, for example, such as wireless communication using IEEE 802.15.1 like Bluetooth Low Energy (BLE), or wireless communication using IEEE 802.11 is exemplified.

In addition, as communication in a second communication scheme according to the present embodiment, wireless communication, for example, such as near field communication (NFC) such as Type-A, Type-B, or Type-F, or infrared communication is exemplified. Note that communication in a second communication scheme according to the present embodiment may be wired communication using, for example, communication performed via a communication interface based on a local area network (LAN), a Universal Serial Bus (USB), the ISO 7816 standard, or the like.

A case in which communication in the first communication scheme according to the present embodiment is BLE and communication in the second communication scheme according to the present embodiment is NFC will be exemplified below.

In the case in which communication in the first communication scheme according to the present embodiment is BLE and communication in the second communication scheme according to the present embodiment is NFC, the communication in the second communication scheme has a shorter communicable distance than the communication in the first communication scheme. That is, the case in which communication in the second communication scheme has a shorter communicable distance than communication in the first communication scheme will be described below. In addition, in a case in which communication in the first communication scheme according to the present embodiment is wireless communication using IEEE 802.15.1 such as BLE, the communication in the first communication scheme can be communication that can be performed with low power consumption.

Note that it is needless to say that a combination of communication in the first communication scheme and communication in the second communication scheme according to the present embodiment is not limited to BLE and NFC.

In a case in which communication in the first communication scheme is BLE, devices that perform communication in the first communication scheme are classified into, for example, a device on a side of transmitting various information by broadcast (which can be referred to as "Peripheral" below) and a device on a side of sensing Peripheral on the basis of information transmitted by broadcast (which can be referred to as "Central" below).

FIG. 1 is an explanatory diagram for describing the information processing method according to the present embodiment, showing an example of an information processing system 1000 to which the information processing method according to the present embodiment is applied.

The information processing system 1000 has an information processing device 100, an information processing device 200, and a server 300.

The information processing device 100 and the information processing device 200 have functions of performing communication using, for example, the first communication scheme and second communication scheme, respectively.

The information processing device 100 is a device that performs a process relating to the information processing method according to the present embodiment. The information processing device 100 plays a role of Central in communication in the first communication scheme.

In addition, the information processing device 200 is another device that serves as a communication target of the information processing device 100 in communication in the first communication scheme. The information processing device 200 plays a role of Peripheral in the communication in the first communication scheme.

There are cases in which another device that serves as a communication target of one device in communication in the first communication scheme is referred to as a "communication target device" below.

In addition, the information processing device 100 and the server 300 are connected via, for example, a network 400. As the network 400, for example, a wired network such as a local area network (LAN) or a wide area network (WAN), a wireless network such as a wireless local area network (WLAN), the Internet using a communication protocol such as Transmission Control Protocol/Internet Protocol (TCP/IP), or the like is exemplified. Note that, in the information processing system according to the present embodiment, the information processing device 100 and the server 300 can also directly communicate with each other without the network 400.

The information processing device 100 acquires information to be used in a process relating to the information processing according to the present embodiment (e.g., information to be used in authentication in a communication establishment process which will be described below) by performing communication with the server 300.

Note that a configuration of the information processing system according to the present embodiment is not limited to the example illustrated in FIG. 1.

The information processing system according to the present embodiment may not have, for example, the server 300.

In addition, the information processing system according to the present embodiment may have, for example, either or both of a plurality of information processing devices 100 playing the role of Central and a plurality of information processing devices 200 playing the role of Peripheral.

Figure 2A:
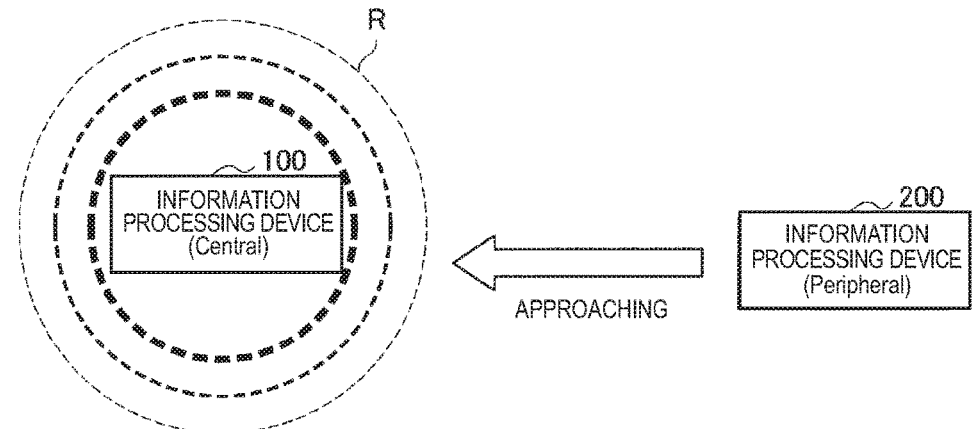
FIGS. 2A and 2B are explanatory diagrams for describing an information processing method according to an embodiment.
Figure 2B:
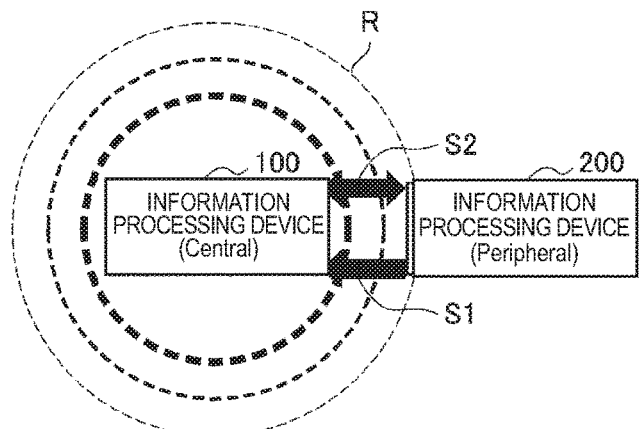

FIGS. 2A and 2B are explanatory diagrams for describing the information processing method according to the present embodiment, showing an overview of communication performed using BLE (an example of the first communication scheme) between the information processing device 100 (Central) and the information processing device 200 (Peripheral). "R" shown in FIGS. 2A and 2B represent an example of a communicable range of the information processing device 100 in which communication can be performed using the first communication scheme.

The information processing device 200 periodically or non-periodically transmits information, for example, such as an "advertising packet," which will be described below, by broadcast.

For example, when the information processing device 200 enters the communicable range R of the information processing device 100 when a user of the information processing device 200 moves or the like, the information processing device 100 receives information transmitted by broadcast from the information processing device 200 in communication in the first communication scheme (S1 of FIGS. 2A and 2B). By receiving the information transmitted by broadcast from the information processing device 200, the information processing device 100 detects the information processing device 200 as a device that can be a communication target of the communication in the first communication scheme.

Then, a process for establishing communication in the first communication scheme such as pairing is performed between the information processing device 100 and the information processing device 200 via a communication path for the first communication scheme (S2 of FIG. 22). Then, in a case in which the process for establishing the communication in the first communication scheme is completed normally (e.g., in a case in which pairing is performed normally), communication between the information processing device 100 and the information processing device 200 in the first communication scheme is established.

Note that, even in a case in which the information processing system according to the present embodiment has either or both of a plurality of information processing devices 100 and a plurality of information processing devices 200, communication in the first communication scheme is established between each of the information processing devices 100 and the information processing devices 200 similarly to the overview illustrated in FIGS. 2A and 2B.

[2] Information Processing Method According to Present Embodiment

Next, a process relating to the information processing method according to the present embodiment will be described. A case in which the information processing device 100 illustrated in FIG. 1 performs the process relating to the information processing method according to the present embodiment will be exemplified below. In addition, a case in which the information processing device 200 illustrated in FIG. 1 performs a process relating to another information processing method according to the present embodiment will be exemplified below.

In addition, an example of a configuration of the information processing device 100 constituting the information processing system 1000 illustrated in FIG. 1 will be described and the process relating to the information processing method according to the present embodiment will be described below.

Furthermore, an example of a configuration of the information processing device 200 constituting the information processing system 1000 illustrated in FIG. 1 will be described and the process relating to the other information processing method according to the present embodiment performed by the information processing device 200 will be described below.

[2-1] Information Processing Device 100

Figure 3:
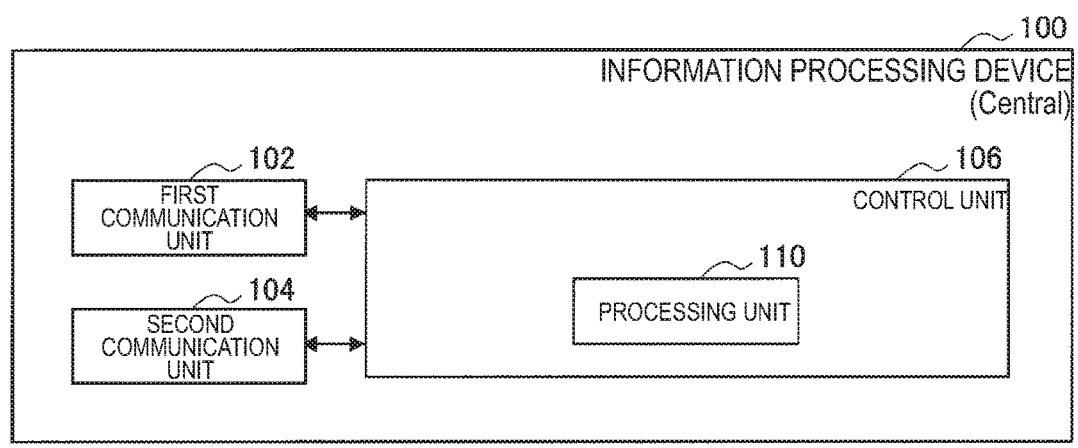
FIG. 3 is a block diagram illustrating an example of a configuration of an information processing device according to the embodiment that can perform a process relating to the information processing method according to the embodiment.

FIG. 3 is a block diagram illustrating an example of a configuration of the information processing device 100 according to the present embodiment that can perform the process relating to the information processing method according to the present embodiment. In the case in which communication in the first communication scheme is BLE or the like, for example, the information processing device 100 plays the role of Central in the communication in the first communication scheme.

The information processing device 100 includes, for example, a first communication unit 102, a second communication unit 104, and a control unit 106.

In addition, the information processing device 100 may also include, for example, a read only memory (ROM, which is not illustrated), a random access memory (RAM, which is not illustrated), a storage unit (which is not illustrated), an operation unit (which is not illustrated) operable by a user, a display unit (which is not illustrated) that displays various screens on a display screen, and the like. The information processing device 100 has the above-described constituent elements connected to each other by, for example, a bus serving as a data transmission path.

The ROM (which is not illustrated) stores control data such as a program, arithmetic parameters, and the like to be used by the control unit 106. The RAM (which is not illustrated) temporarily stores a program and the like to be executed by the control unit 106.

A storage unit (which is not illustrated) is a storage section provided in the information processing device 100, and stores various kinds of data, for example, data relating to the information processing method according to the present embodiment such as identification information or service type information, which will be described below, various applications, and the like. Here, as the storage unit (which is not illustrated), for example, a magnetic recording medium such as a hard disk, a non-volatile memory such as a flash memory, and the like are exemplified. In addition, the storage unit (which is not illustrated) may be detachable from the information processing device 100.

As the operation unit (which is not illustrated), an operation input device which will be described below is exemplified. In addition, as the display unit (which is not illustrated), a display device which will be described below is exemplified.

[Example of Hardware Configuration of Information Processing Device 100]

Figure 4:
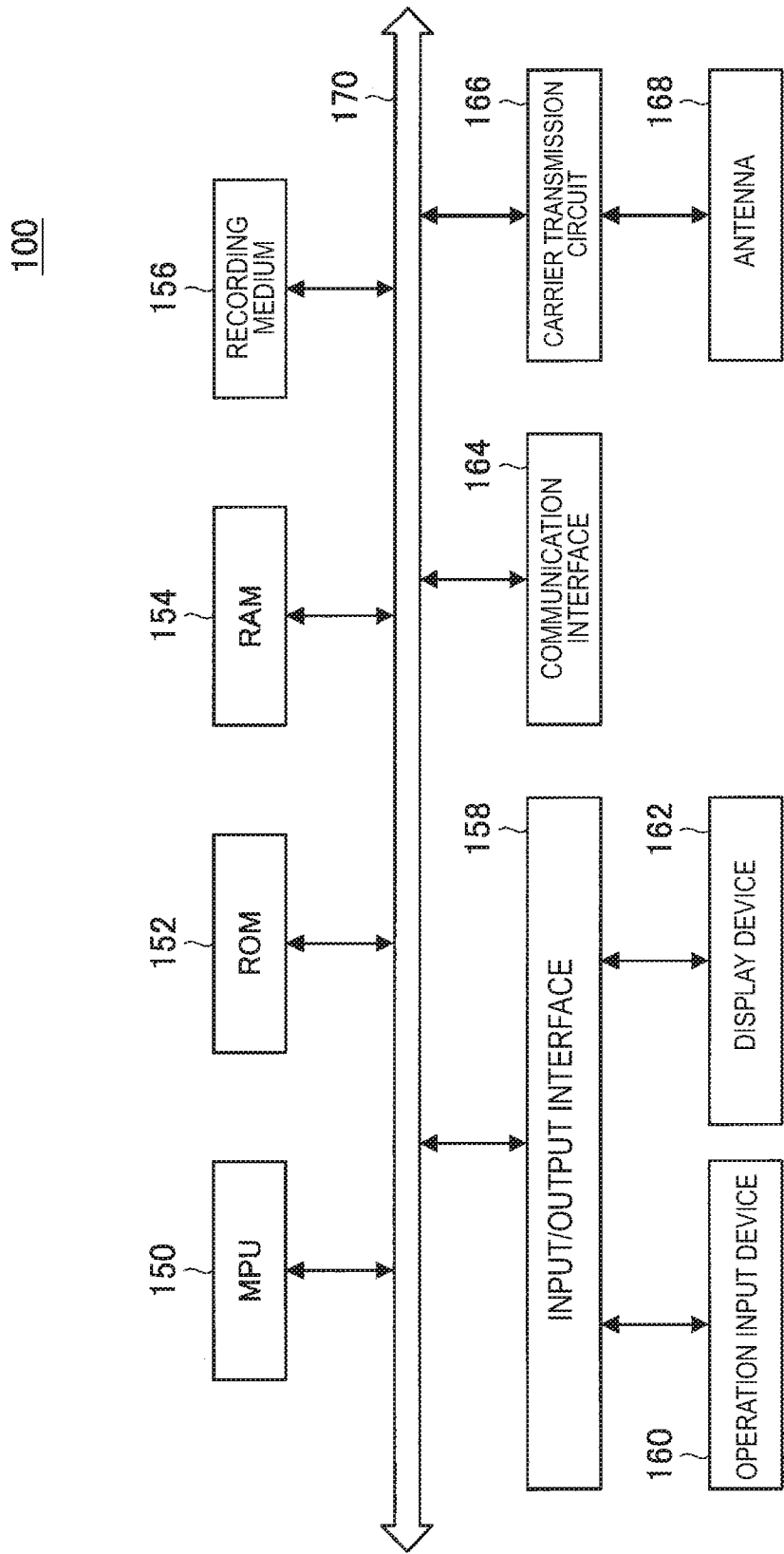
FIG. 4 is an explanatory diagram illustrating an example of a hardware configuration of the information processing device according to the embodiment that can perform the process relating to the information processing method according to the embodiment.

FIG. 4 is an explanatory diagram illustrating an example of a hardware configuration of the information processing device 100 according to the present embodiment that can perform the process relating to the information processing method according to the present embodiment. FIG. 4 shows the example of the hardware configuration of the information processing device 100 in a case in which communication in the second communication scheme is NFC.

The information processing device 100 includes, for example, an MPU 150, a ROM 152, a RAM 154, a recording medium 156, an input/output interface 158, an operation input device 160, a display device 162, a communication interface 164, a carrier transmission circuit 166, and an antenna 168. In addition, the information processing device 100 has, for example, a bus 170 connecting the constituent elements to one another as a data transmission path.

The MPU 150 includes, for example, one or two or more processors, various processing circuits, and the like including arithmetic circuits such as micro-processing units (MPUs), and functions as the control unit 106 which controls the entire information processing device 100. In addition, the MPU 150 plays a role of, for example, a processing unit 110, which will be described below, in the information processing device 100.

The ROM 152 stores control data, and the like such as programs and arithmetic parameters to be used by the MPU 150. The RAM 154 temporarily stores, for example, a program to be executed by the MPU 150, and the like.

The recording medium 156 functions as the storage unit (which is not illustrated), and stores various kinds of data, for example, data relating to the information processing method according to the present embodiment such as identification information and service type information, which will be described below, various applications, and the like. Here, as the recording medium 156, for example, a magnetic recording medium such as a hard disk, a non-volatile memory such as a flash memory, and the like are exemplified. In addition, the recording medium 156 may be detachable from the information processing device 100.

The input/output interface 158 connects, for example, the operation input device 160 and the display device 162. The operation input device 160 functions as an operation unit (which is not illustrated), and the display device 162 functions as a display unit (which is not illustrated). Here, as the input/output interface 158, for example, a Universal Serial Bus (USB) terminal, a digital visual interface (DVI) terminal, a High-Definition Multimedia Interface (HDMI) (registered trademark) terminal, various processing circuits, and the like are exemplified.

In addition, the operation input device 160 is provided, for example, on the information processing device 100 and connected to the input/output interface 158 inside the information processing device 100. As the operation input device 160, for example, buttons, arrow keys, a rotation-type selector such as a jog dial, a combination thereof, or the like are exemplified.

Furthermore, the display device 162 is provided on, for example, the information processing device 100, and connected to the input/output interface 158 inside the information processing device 100. As the display device 162, for example, a liquid crystal display, an organic electro-luminescence (EL) display (also called an organic light emitting diode (OLED) display), or the like is exemplified.

Note that it is needless to say that the input/output interface 158 can also be connected to an external operation input device (e.g., a keyboard, a mouse, or the like) or an external display device serving as external devices of the information processing device 100. In addition, the display device 162 may be a device, for example, such as a touch screen capable of display and user operations.

The communication interface 164 is a communication section provided in the information processing device 100 for performing communication in the first communication scheme, and functions as the first communication unit 102. Here, as the communication interface 164, for example, an IEEE 802.15.1 port and a transmission/reception circuit, an IEEE 802.11 port and a transmission/reception circuit, or the like is exemplified.

The carrier transmission circuit 166 and the antenna 168 are a communication section provided in the information processing device 100 for performing communication in the second communication scheme, and function as the second communication unit 104. The carrier transmission circuit 166 and the antenna 168 function as a reader/writer in NFC.

The antenna 168 is constituted by, for example, a resonance circuit including a coil having a predetermined inductance as a transmission/reception antenna and a capacitor having a predetermined electrostatic capacity and a demodulation circuit. In addition, the antenna 168 demodulates data or the like transmitted from an external device such as the information processing device 200 through load modulation or the like by receiving a carrier having a predetermined frequency of, for example, 13.56 [MHz]. Note that, in a case in which the carrier transmission circuit 166 includes a demodulation circuit, the antenna 168 may be constituted by a resonance circuit.

The carrier transmission circuit 166 includes, for example, a modulation circuit which performs modulation such as Amplitude Shift Keying (ASK) and an amplification circuit which amplifies output of the modulation circuit, and transmits a carrier on which a carrier signal is placed from the transmission/reception antenna of the antenna 168. In addition, the carrier transmission circuit 166 may include, for example, a demodulation circuit that demodulates a signal received using the antenna 168. The demodulation circuit demodulates the signal received by the antenna 168 by, for example, performing envelope detection for an amplitude change of a voltage between a modulation circuit (or an amplification circuit) and a resonance circuit of the antenna 168 and binarizing the detected signal. Note that the demodulation circuit can also demodulate the signal received by the antenna 168 using, for example, a phase change of a voltage between the modulation circuit (or the amplification circuit) and the resonance circuit of the antenna 168.

By including the carrier transmission circuit 166, the information processing device 100 can have an initiator function in performing NFC and plays a role of a so-called reader/writer. Here, as a carrier signal transmitted by the carrier transmission circuit 166 from the antenna 168, for example, a polling signal, a signal indicating any of various kinds of data, or the like is exemplified. In addition, the transmission of the carrier of the carrier transmission circuit is controlled by, for example, the MPU 150.

The information processing device 100 performs a process relating to the information processing method according to the present embodiment using, for example, the configuration illustrated in FIG. 4. Note that a hardware configuration of the information processing device 100 according to the present embodiment is not limited to the configuration illustrated in FIG. 4.

The information processing device 100 may not include the communication interface 164 in a case in which, for example, communication in the first communication scheme is performed with an external device via a connected external communication device that can perform communication in the first communication scheme.

In addition, in a case in which the information processing device 100 does not function as a reader/writer in NFC, the information processing device 100 may include an IC chip 266 and an antenna 268, which will be described below, instead of the carrier transmission circuit 166 and the antenna 168 illustrated in FIG. 4. The information processing device 100 can also employ the configuration in which the IC chip 266 and an antenna 268, which will be described below, are further included.

In addition, in a case in which communication in the second communication scheme is not NFC, the information processing device 100 may not include the carrier transmission circuit 166 and the antenna 168. Furthermore, in the case in which communication in the second communication scheme is not NFC, the information processing device 100 may further include a communication device that supports communication in the second communication scheme, such as an infrared communication device.

In addition, information processing device 100 may not include a communication device that supports communication in the second communication scheme, such as the carrier transmission circuit 166 and the antenna 168, in a case in which communication in the second communication scheme is performed with an external device via a connected external communication device that can perform communication in the second communication scheme.

Furthermore, the information processing device 100 may further include another communication device, for example, a LAN terminal and a transmission/reception circuit, a communication antenna such as an antenna for LTE/3G and a radio frequency (RF) circuit, or the like. The information processing device 100 can perform communication with an external device such as the server 300 via the above-described connected other communication device or the above-described other connected external communication device.

In addition, the information processing device 100 may also employ a configuration in which, for example, one or two or more of the recording medium 156, the operation input device 160, and the display device 162 are not included. Furthermore, the configuration illustrated in FIG. 4 (or a configuration according to a modified example), for example, may be realized with one or two or more integrate circuits (ICs).

The example of the configuration of the information processing device 100 will be described with reference to FIG. 3 again.

The first communication unit 102 performs communication with an external device through communication in the first communication scheme. The communication of the first communication unit 102 in the first communication scheme is controlled by, for example, a control unit 106 (more specifically, for example, the processing unit 110). Here, as the first communication unit 102, for example, an IEEE 802.15.1 port and a transmission/reception circuit, an IEEE 802.11 port and a transmission/reception circuit, or the like is exemplified.

The second communication unit 104 performs communication with an external device through communication in the second communication scheme. The communication of the second communication unit 104 in the second communication scheme is controlled by, for example, the control unit 106 (more specifically, for example, the processing unit 110).

Here, as the second communication unit 104, for example, a communication device that supports NFC such as the carrier transmission circuit 166 and the antenna 168 illustrated in FIG. 4, an infrared communication device, or the like is exemplified.

The control unit 106 is constituted by, for example, an MPU and the like, and plays a role of controlling the information processing device 100 overall. In addition, the control unit 106 includes, for example, the processing unit 110 and plays a leading role of performing the process relating to the information processing method according to the present embodiment.

The processing unit 110 plays a leading role of performing the process relating to the information processing method according to the present embodiment. The processing unit 110 performs a communication establishment process introduced in (1) described below, for example, as the process relating to the information processing method according to the present embodiment.

(1) Communication Establishment Process

The processing unit 110 authenticates a communication target device by performing a process using information to be used in a process to be performed in communication in the second communication scheme, using a communication path of communication in the first communication scheme, and thereby establishes communication with the communication target device in the first communication scheme.

Here, "performing a process using information to be used in a process to be performed in communication in the second communication scheme, using a communication path of communication in the first communication scheme" corresponds to "combining different communication schemes that are communication in the first communication scheme and communication in the second communication scheme."

Specifically, the processing unit 110 authenticates the communication target device (Peripheral), such as the information processing device 200 illustrated in FIG. 1, on the basis of the predetermined information to be used in the process to be performed in communication in the second communication scheme, the information being transmitted by broadcast through communication in the first communication scheme from the communication target device.

The processing unit 110 authenticates a communication target device on the basis of acquired predetermined information in a case in which the predetermined information is acquired via a communication device with a function of performing communication in the first communication scheme. As the above-described communication device with the function of performing communication in the first communication scheme, for example, the first communication unit 102, or an external communication device connected to the information processing device 100 is exemplified.

As such predetermined information according to the present embodiment, one or both of identification information indicating a device (e.g., an ID indicating a device, or the like) and service type information indicating a service (e.g., an ID indicating a service, or the like) are exemplified.

The processing unit 110 authenticates a communication target device as introduced in, for example, (A) to (C) described below.

(A) First Example of Authentication Based on Predetermined Information:

Case in which predetermined information is identification information

The processing unit 110 authenticates a communication target device on the basis of identification information acquired from the communication target device. The processing unit 110 authenticates the communication target device by, for example, comparing the identification information acquired from the communication target device with identification information stored in the recording medium.

The processing unit 110 determines that the communication target device has been authenticated in a case in which, for example, the device indicated by the acquired identification information coincides with the device indicated by the identification information stored in the recording medium.

As the recording medium in which identification information is stored, for example, the storage unit (which is not illustrated) included in the information processing device 100, an external recording medium connected to the information processing device 100, a recording medium included in an external device provided outside the information processing device 100, such as the server 300, or an external recording medium connected to the external device is exemplified.

In a case in which the recording medium in which identification information is stored is a recording medium included in an external device such as the server 300 or an external recording medium connected to the external device, the processing unit 110, for example, acquires the identification information from the external device and authenticates the communication target device using the identification information acquired from the external device. The processing unit 110 acquires the identification information from the external device by causing, for example, the above-described other communication device or the like to transmit a transmission request including a transmission instruction for the identification information to the external device such as the server 300.

(B) Second Example of Authentication Based on Predetermined Information:

Case in which predetermined information is service type information

The processing unit 110 authenticates a communication target device on the basis of service type information acquired from the communication target device. The processing unit 110 authenticates the communication target device by, for example, comparing the service type information acquired from the communication target device with service type information stored in the recording medium.

In a case in which the service indicated by the acquired service type information coincides with the service indicated by the service type information stored in the recording medium, for example, the processing unit 110 determines that the communication target device has been authenticated. In addition, in a case in which the acquired service type information indicates a plurality of services and some of the services coincide with the service, the processing unit 110 can determine that the communication target device has been authenticated as well. As the case in which some of the services coincide with the service, for example, a case in which a predetermined service set among the plurality of services coincides with the service, or a case in which the number of services among the plurality of services that coincide with the service is greater than or equal to a predetermined threshold value (or a case in which the number of services among the plurality of services that coincide with the service is greater than a predetermined threshold value) is exemplified.

As the recording medium in which service type information is stored, for example, the storage unit (which is not illustrated) included in the information processing device 100, an external recording medium connected to the information processing device 100, a recording medium included in an external device provided outside the information processing device 100, such as the server 300, or an external recording medium connected to the external device is exemplified.

In a case in which the recording medium in which service type information is stored is a recording medium included in an external device such as the server 300 or an external recording medium connected to the external device, the processing unit 110, for example, acquires the service type information from the external device and authenticates the communication target device using the service type information acquired from the external device. The processing unit 110 acquires the service type information from the external device by causing, for example, the above-described other communication device or the like to transmit a transmission request including a transmission instruction for the service type information to the external device such as the server 300.

(C) Third Example of Authentication Based on Predetermined Information

The processing unit 110 can also authenticate a communication target device by combining the process according to the first example introduced in (A) described above and the process according to the second example introduced in (B) described above.

The processing unit 110 determines that the communication target device has been authenticated in, for example, "a case in which the communication target device is determined to have been authenticated through a similar process to the process according to the first example introduced in (A) described above and the communication target device is determined to have been authenticated through a similar process to the process according to the second example introduced in (B) described above."

The processing unit 110 authenticates the communication target device by performing, for example, any process of the process according to the first example introduced in (A) described above to the process according to the third example introduced in (C) described above.

Then, in a case in which the authentication is completed, the processing unit 110 establishes communication with the communication target device in the first communication scheme.

The processing unit 110 establishes communication with the communication target device in the first communication scheme by, for example, performing a process, which is called pairing for connecting communicating apparatuses, with the communication target device. Note that it is needless to say that a method for establishing communication with a communication target device in the first communication scheme is not limited to pairing.

The processing unit 110 performs the above-described communication establishment process as the process relating to the information processing method according to the present embodiment.

Here, information used by the information processing device 100 in any process of the process according to the first example introduced in (A) described above to the process according to the third example introduced in (C) described above is predetermined information to be used in a process to be performed in communication in the second communication scheme. Thus, since the above-described communication establishment process is performed, authentication of a communication target device is realized by combining different communication schemes that are communication in the first communication scheme and communication in the second communication scheme.

Thus, the information processing device 100 including the processing unit 110 can authenticate a communication target device by combining the different communication schemes and establish communication with the communication target device in one communication scheme.

Note that the process relating to the information processing method according to the present embodiment is not limited to the above-described process (1) (communication establishment process).

The processing unit 110 can perform an execution process introduced in (2) described below in a case in which, for example, communication with the communication target device in the first communication scheme is established.

Note that communication in the first communication scheme established in the case in which the execution process introduced in (2) described below is performed may be regarded as having been established through the above-described process (1) (communication establishment process) according to the information processing method according to the present embodiment, or may be regarded as having been established using an arbitrary establishment method such as an establishment method based on a predetermined user operation such as a user operation for pairing.

A case in which communication with the communication target device in the first communication scheme is established through the above-described process (1) (communication establishment process) will be mainly exemplified below.

(2) Execution Process

When communication with the communication target device in the first communication scheme is established, the processing unit 110 performs a process using the information to be used in a process to be performed in communication in the second communication scheme through the established communication with the communication target device in the first communication scheme.

As the process using the information to be used in a process to be performed in communication in the second communication scheme, for example, processes relating to a service to be provided using NFC (e.g., one or two or more arbitrary processes such as an arbitrary process in accordance with a result of individual authentication, a billing process, and the like) are exemplified. In addition, as the process using the information to be used in the process to be performed in communication in the second communication scheme, for example, an arbitrary process performed in use cases, which will be described below, is exemplified.

In addition, as the information to be used in the process to be performed in communication in the second communication scheme, for example, information stored in a secure recording medium is exemplified. As the secure recording medium, for example, a recording medium with tamper resistance is exemplified. Furthermore, the secure recording medium may include a secure area that requires authentication using an encryption key or the like or a non-secure are that does not require authentication when access to the recording medium such as reading or writing is made.

Note that it is needless to say that information to be used in the process to be performed in communication in the second communication scheme is not limited to the information stored in a secure recording medium. A case in which the information to be used in the process to be performed in communication in the second communication scheme, which is used in an execution process, is information stored in a secure recording medium will be exemplified below.

In addition, the processing unit 110 can also perform, for example, processes that are introduced in (a) to (d) described below as execution processes. Note that it is needless to say that an example of execution process is not limited to the processes that are introduced in (a) to (d) described below.

(a) First Example of Execution Process

The processing unit 110 determines a state of communication with a communication target device in the first communication scheme, and acquires information stored in a secure recording medium from the communication target device on the basis of the determination result.

The processing unit 110 acquires the information stored in the secure recording medium from the communication target device by, for example, transmitting a transmission request including an information transmission instruction to the communication target device through communication in the first communication scheme. The processing unit 110 transmits the transmission request to the communication target device by, for example, controlling the first communication unit 102.

Then, the processing unit 110 performs a process using the acquired information stored in the secure recording medium.

Here, as the state of communication in the first communication scheme according to the present embodiment, for example, communication strength in communication in the first communication scheme or a communication distance in communication in the first communication scheme is exemplified. The processing unit 110 acquires the information stored in the secure recording medium from the communication target device by, for example, performing any process among processes (a-1) to (a-3) described below.

(a-1) Case in which State of Communication in First Communication Scheme Refers to Communication Strength in Communication in First Communication Scheme The processing unit 110 acquires communication strength in communication in the first communication scheme by measuring signal strength of a signal transmitted from the communication target device in the communication in the first communication scheme using a received signal strength indicator (RSSI) included in the information processing device 100 or an external RSSI connected to the information processing device 100. Note that the processing unit 110 may acquire communication strength in communication in the first communication scheme using an arbitrary method in which communication strength in the communication in the first communication scheme can be acquired, such as a method of estimating communication strength in the communication in the first communication scheme.

In addition, in a case in which the acquired communication strength has a value greater than a predetermined threshold value or the communication strength has a value greater than or equal to the threshold value, for example, the processing unit 110 acquires the information stored in the secure recording medium from the communication target device. Here, as the predetermined threshold value relating to the communication strength, for example, a fixed threshold value set in advance, or a variable threshold value that can be adjusted on the basis of a user operation or the like is exemplified. In addition, the predetermined threshold value relating to the communication strength may be dynamically set using, for example, an algorithm for dynamically changing the threshold value on the basis of a measurement result of a pattern of the communication strength.

(a-2) Case in which State of Communication in First Communication Scheme Refers to a Communication Distance in Communication in First Communication Scheme The processing unit 110 acquires a communication distance by, for example, estimating the communication distance on the basis of a signal strength of a signal transmitted from the communication target device in communication in the first communication scheme. In addition, the processing unit 110 may acquire a communication distance using an arbitrary method in which the communication distance can be acquired, for example, a "method of estimating a communication distance on the basis of a time from when a signal is transmitted to the communication target device in communication in the first communication scheme to when a response signal transmitted from the communication target device is received."

In addition, in a case in which the acquired communication distance has a value smaller than a predetermined threshold value or the communication distance has a value smaller than or equal to the predetermined threshold value, for example, the processing unit 110 acquires the information stored in the secure recording medium from the communication target device. Here, as the predetermined threshold value of the above-described communication distance, for example, a fixed threshold value set in advance or a variable threshold value that can be adjusted on the basis of a user operation or the like is exemplified.

(a-3)

The processing unit 110 can also acquire the information stored in the secure recording medium from the communication target device by combining the above-described process introduced in (a-1) and the above-described process introduced in (a-2).

In a "case in which the acquired communication strength is greater than the predetermined threshold value relating to communication strength and the acquired communication distance is shorter than the predetermined threshold value relating to communication distance," for example, the processing unit 110 acquires the information stored in the secure recording medium from communication target device. Note that it is needless to say that an example of the combined process of the above-described process introduced in (a-1) and the above-described process introduced in (a-2) is not limited to the above-described example.

(b) Second Example of Execution Process

The processing unit 110 determines a predetermined action performed by a user of the communication target device and acquires the information stored in the secure recording medium from the communication target device on the basis of the determination result.

In a case in which the predetermined action is determined to have been performed, the processing unit 110 transmits a transmission request including an information transmission instruction to the communication target device, and thereby acquires the information stored in the secure recording medium from the communication target device.

Then, the processing unit 110 performs a process using the acquired information stored in the secure recording medium.

Here, as the predetermined action relating to the present embodiment, for example, one or two or more arbitrary actions that can be detected by the information processing device 100, such as a specific operation (e.g., pressing a button or the like) with respect to communication target device, an action of moving the communication target device, or a combination thereof, is exemplified.

The processing unit 110 determines that the predetermined action has been performed in a case in which, for example, an operation signal indicating a specific operation transmitted from the communication target device using communication in the first communication scheme is detected.

In addition, the processing unit 110 detects movement of the communication target device on the basis of, for example, one or both of motion information and position information transmitted from the communication target device using communication in the first communication scheme. Then, in a case in which movement of the communication target device is detected, the processing unit 110 determines that the predetermined action has been performed.

Here, as the motion information, for example, data indicating a detection result of a motion sensor such as an acceleration sensor or an angular velocity sensor is exemplified. In addition, as the position information, for example, data indicating a detection result of a device that can specify a position, such as global navigation satellite system (GNSS) device or the like (or data indicating an estimation result of a device that can estimate a position using an arbitrary method) is exemplified.

(c) Third Example of Execution Process

As described above, in the information processing system according to the present embodiment, there can be cases in which a plurality of information processing devices 200 playing a role of Peripheral are present in communication in the first communication scheme. Thus, when a plurality of information processing devices 200 are present, there can be cases in which a plurality of communication target devices that have established communication with the information processing device 100 in the first communication scheme are present in the information processing system according to the present embodiment.

As described above, in the case in which a plurality of communication target devices that have established communication in the first communication scheme are present, the processing unit 110 performs a process using information to be used in a process to be performed in communication in the second communication scheme via the communication established with each of the plurality of communication target devices in the first communication scheme.

Here, the processing unit 110 performs the process using the information to be used in the process to be performed in communication in the second communication scheme, for example, independently with respect to each of the plurality of communication target devices.

Note that an execution process performed in the case in which a plurality of communication target devices that have established communication in the first communication scheme are present is not limited to the above-described example.

For example, the processing unit 110 can also change a process to be executed on the basis of a combination of information acquired from each of the plurality of communication target devices, the information to be used in a process to be performed in communication in the second communication scheme.

As examples of a process based on a combination of information to be used in a process to be performed in communication in the second communication scheme, for example, the following examples are exemplified. Note that it is needless to say that examples of a process based on a combination of information to be used in a process to be performed in communication in the second communication scheme are not limited to the following examples.

Authority of users associated with the plurality of communication target devices respectively is ascertained, then only the process supported by a communication target device having the highest authority is performed, and processes not supported by the communication target device having the highest authority is not performed.

Authority of users associated with the plurality of communication target devices respectively is ascertained, and in a case in which there is a communication target device associated with a specific user (e.g., a child, or the like), a process to be performed is restricted.

IDs indicating devices (or user IDs) associated with the plurality of communication target devices respectively are ascertained, and in a case in which a combination of IDs indicating devices (or user IDs) satisfies a set condition, a set process is executed, and in a case in which the combination does not satisfy the condition, the set process is not executed. Here, as the set condition, an arbitrary condition for a combination, for example, "satisfying a combination of IDs indicating specific devices (or a combination of specific user IDs)" or the like, is exemplified. In a case in which the set condition is that "satisfying a combination of IDs indicating specific devices," for example, an operation of "not performing a process when a communication target device that has established communication in the first communication scheme is solely a device A alone and performing a process when communication target devices that have established communication in the first communication scheme are devices A and B" is realized.

(d) Fourth Example of Execution Process

The processing unit 110 can also perform a process obtained by combining two or more of the execution process relating to the first example introduced in (a) described above to the execution process relating to the third example introduced in (c) described above.

As an example, in a case in which a process obtained by combining the execution process relating to the first example introduced in (a) described above and the execution process relating to the second example introduced in (b) described above is performed and information stored in the secure recording medium is acquired through the execution process relating to the first example introduced in (a) described above or the execution process relating to the second example introduced in (b) described above, for example, the processing unit 110 performs a process using the acquired information stored in the secure recording medium.

By including the processing unit 110, for example, the control unit 106 plays a leading role of performing a process relating to the information processing method according to the present embodiment (e.g., "the above-described process (1) (communication establishment process)," or "the above-described process (1) (communication establishment process) and the above-described process (2) (execution process)").

By employing the configuration illustrated in FIG. 3, for example, the information processing device 100 performs a process relating to the information processing method according to the present embodiment (e.g., "the above-described process (1) (communication establishment process)," or "the above-described process (1) (communication establishment process) and the above-described process (2) (execution process)").

Therefore, the information processing device 100 can authenticate a communication target device using a combination of different communication schemes and establish communication with the communication target device in one communication scheme in, for example, the configuration illustrated FIG. 3.

In addition, in the configuration illustrated FIG. 3, for example, the information processing device 100 can exhibit effects that can be obtained by performing the above-described process relating to the information processing method according to the present embodiment.

Note that, as described above, communication with a communication target device in the first communication scheme may be established using an arbitrary establishment method such as an establishment method based on a predetermined user operation such as an operation relating to pairing of a user or the like. Thus, in a case in which communication with a communication target device in the first communication scheme is established using a different method from the above-described process (1) (communication establishment process), the processing unit 110 of the information processing device 100 may perform the above-described process (2) (execution process) as the process relating to the information processing method according to the present embodiment.

In addition, a configuration of the information processing device that can perform the process relating to the information processing method according to the present embodiment is not limited to the configuration illustrated in FIG. 3.

The information processing device according to the present embodiment can include the processing unit 110 illustrated in FIG. 3, for example, separately from the control unit 106 (e.g., realized in a separate processing circuit).

Note that each of "the above-described process (1) (communication establishment process)" and "the above-described process (1) (communication establishment process) and the above-described process (2) (execution process)" are prepared by dividing the process relating to the information processing method according to the present embodiment for convenience. Thus, with respect to the process relating to the information processing method according to the present embodiment, for example, "the above-described process (1) (communication establishment process) and the above-described process (2) (execution process)" can be understood as one process. In addition, with respect to the process relating to the information processing method according to the present embodiment, for example, "the above-described process (1) (communication establishment process)" and "the above-described process (1) (communication establishment process) and the above-described process (2) (execution process)" can be respectively understood as two or more processes (using an arbitrary dividing method).

Therefore, a configuration for realizing the process relating to the information processing method according to the present embodiment is not limited to that illustrated in FIG. 3, and a configuration complying with the dividing method for the process relating to the information processing method according to the present embodiment can be employed.

In addition, the information processing device according to the present embodiment may not include the first communication unit 102 in a case in which, for example, the information processing device performs communication in the first communication scheme with an external device via a connected external communication device that can perform communication in the first communication scheme.

Furthermore, the information processing device according to the present embodiment may not include the second communication unit 104 in a case in which, for example, the information processing device performs communication in the second communication scheme with an external device via a connected external communication device that can perform communication in the second communication scheme.

The information processing device 100 according to the present embodiment can be applied to various devices that can perform the process relating to the information processing method according to the present embodiment, for example, computers such as personal computers (PCs) and servers, mobile objects such as automobiles, devices corresponding to each of uses cases that will be described below such as ticket gates, and the like. In addition, the present embodiment can also be applied to, for example, processing ICs that can be incorporated into the above-described devices.

Furthermore, the information processing device 100 according to the present embodiment may be applied to, for example, a processing system on the premise of connection to a network (or communication between devices) such as cloud computing. As an example of a processing system that performs the process relating to the information processing method according to the present embodiment, for example, a system in which the above-described process (1) (communication establishment process) is performed by one device constituting the processing system and the above-described process (2) (execution process) is performed by another device constituting the processing system is exemplified.

[2-2] Information Processing Device 200

Figure 5:
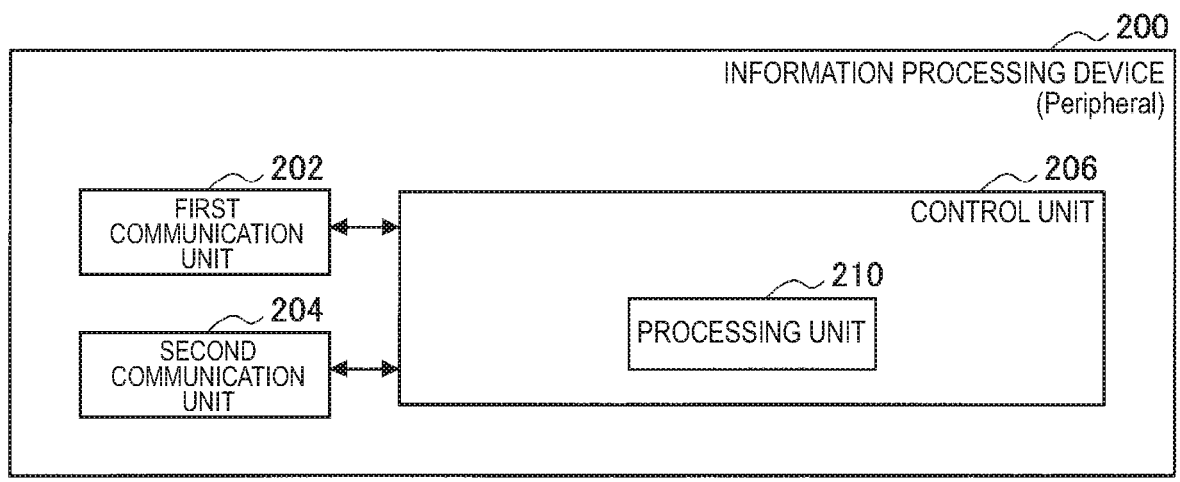
FIG. 5 is a block diagram illustrating an example of a configuration of an information processing device according to the embodiment that can perform a process relating to another information processing method according to the embodiment.

FIG. 5 is a block diagram illustrating an example of a configuration of the information processing device 200 according to the present embodiment that can perform the process relating to another information processing method according to the present embodiment. In the case in which communication in the first communication scheme is BLE or the like, for example, the information processing device 200 plays the role of Peripheral in the communication in the first communication scheme.

The information processing device 200 includes, for example, a first communication unit 202, a second communication unit 204, and a control unit 206.

In addition, the information processing device 200 may also include, for example, a ROM (which is not illustrated), a RAM (which is not illustrated), an operation unit (which is not illustrated) operable by a user, a display unit (which is not illustrated) that displays various screens on a display screen, and the like. The information processing device 200 has the above-described constituent elements connected to each other by, for example, a bus serving as a data transmission path.

The ROM (which is not illustrated) stores control data such as a program, arithmetic parameters, and the like to be used by the control unit 206. The RAM (which is not illustrated) temporarily stores a program and the like to be executed by the control unit 106.

As the operation unit (which is not illustrated), an operation input device which will be described below is exemplified. In addition, as the display unit (which is not illustrated), a display device which will be described below is exemplified.

[Example of Hardware Configuration of Information Processing Device 200]

Figure 6:
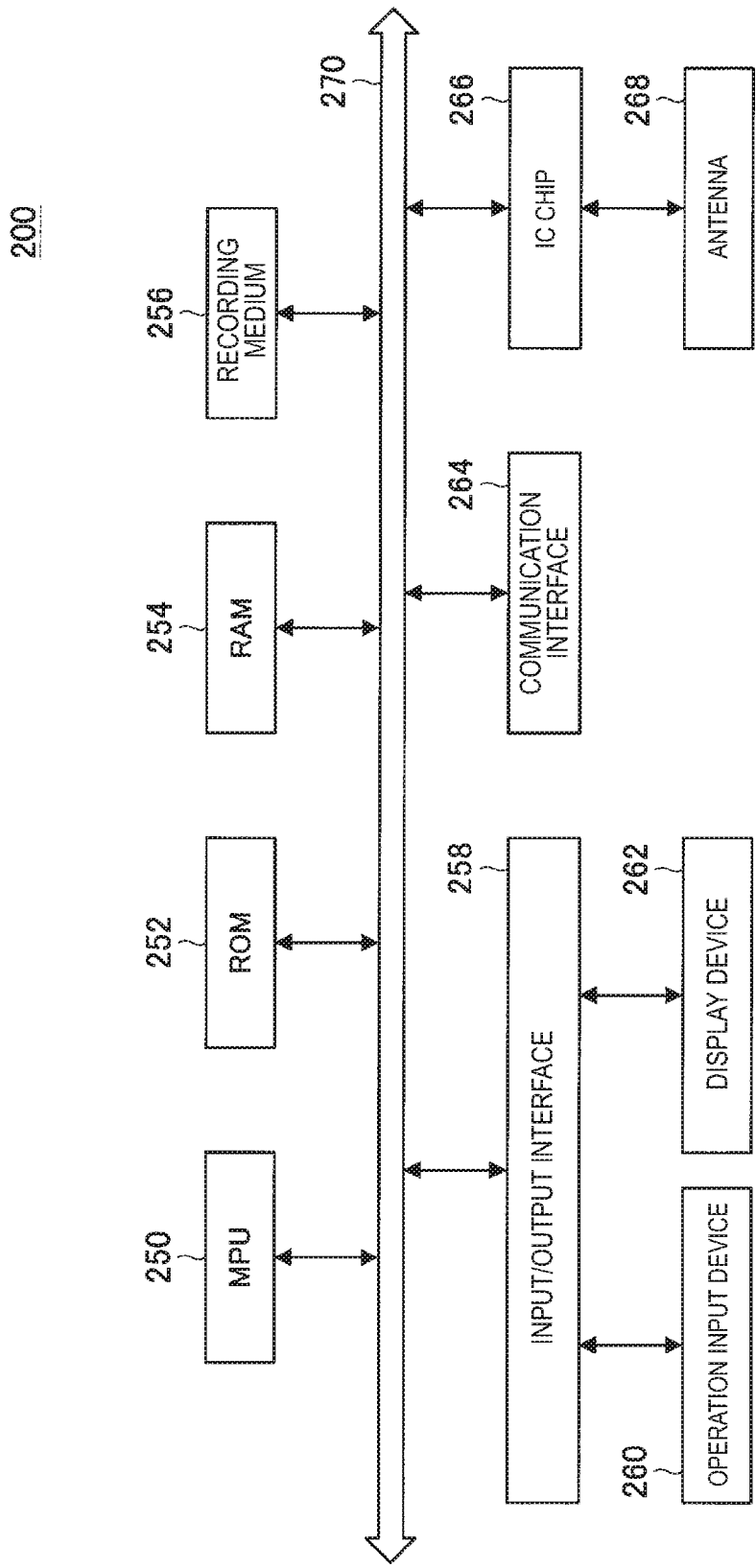
FIG. 6 is an explanatory diagram illustrating an example of a hardware configuration of the information processing device according to the embodiment that can perform a process relating to the other information processing method according to the embodiment.

FIG. 6 is an explanatory diagram illustrating an example of a hardware configuration of the information processing device 100 according to the present embodiment that can perform the process relating to another information processing method according to the present embodiment. FIG. 6 shows the example of the hardware configuration of the information processing device 200 in a case in which communication in the second communication scheme is NFC.

The information processing device 200 includes, for example, an MPU 250, a ROM 252, a RAM 254, a recording medium 256, an input/output interface 258, an operation input device 260, a display device 262, a communication interface 264, and an antenna 268. In addition, the information processing device 200 has, for example, a bus 270 connecting the constituent elements to one another as a data transmission path.

The MPU 250 includes, for example, one or two or more processors, various processing circuits, and the like including arithmetic circuits such as MPUs, and functions as the control unit 206 which controls the entire information processing device 200. In addition, the MPU 250 plays a role of, for example, a processing unit 210, which will be described below, in the information processing device 200.

The ROM 252 stores control data, and the like such as programs and arithmetic parameters to be used by the MPU 250. The RAM 254 temporarily stores, for example, a program to be executed by the MPU 250, and the like.

The recording medium 256 functions as the storage unit (which is not illustrated), and stores various kinds of data, for example, various applications, and the like. Here, as the recording medium 256, for example, a magnetic recording medium such as a hard disk, a non-volatile memory such as a flash memory, and the like are exemplified. In addition, the recording medium 256 may be detachable from the information processing device 200.

The input/output interface 258 connects, for example, the operation input device 260 and the display device 262. The operation input device 260 functions as an operation unit (which is not illustrated), and the display device 262 functions as a display unit (which is not illustrated). Here, as the input/output interface 258, for example, a USB terminal, a DVI terminal, a HDMI (registered trademark) terminal, various processing circuits, and the like are exemplified.

In addition, the operation input device 260 is provided, for example, on the information processing device 200 and connected to the input/output interface 258 inside the information processing device 200. As the operation input device 260, for example, buttons, arrow keys, a rotation-type selector such as a jog dial, a combination thereof, or the like are exemplified.

Furthermore, the display device 262 is provided, for example, on the information processing device 200 and connected to the input/output interface 258 inside the information processing device 200. As the display device 262, for example, a liquid crystal display, an organic EL display, or the like is exemplified.

Note that it is needless to say that the input/output interface 258 can also be connected to an external operation input device (e.g., a keyboard, a mouse, or the like) or an external display device serving as external devices of the information processing device 200. In addition, the display device 262 may be a device, for example, such as a touch screen capable of display and user operations.

The communication interface 264 is a communication section provided in the information processing device 200 for performing communication in the first communication scheme, and functions as the first communication unit 202. Here, as the communication interface 264, for example, an IEEE 802.15.1 port and a transmission/reception circuit, an IEEE 802.11 port and a transmission/reception circuit, or the like is exemplified.

The IC chip 266 and the antenna 268 is a communication section included in the information processing device 200 for performing communication in the second communication scheme. The IC chip 266 and the antenna 268 performs communication based on NFC with a reader/writer an external device that functions as a reader/writer using, for example, a carrier having a predetermined frequency of 13.56 [MHz] or the like. The antenna 268 plays a role of receiving a carrier and transmitting a response signal. In addition, the IC chip 266 demodulates and processes a carrier signal transmitted from an external device such as a reader/writer on the basis of the received carrier and causes a response signal to be transmitted using load modulation.

Figure 7:
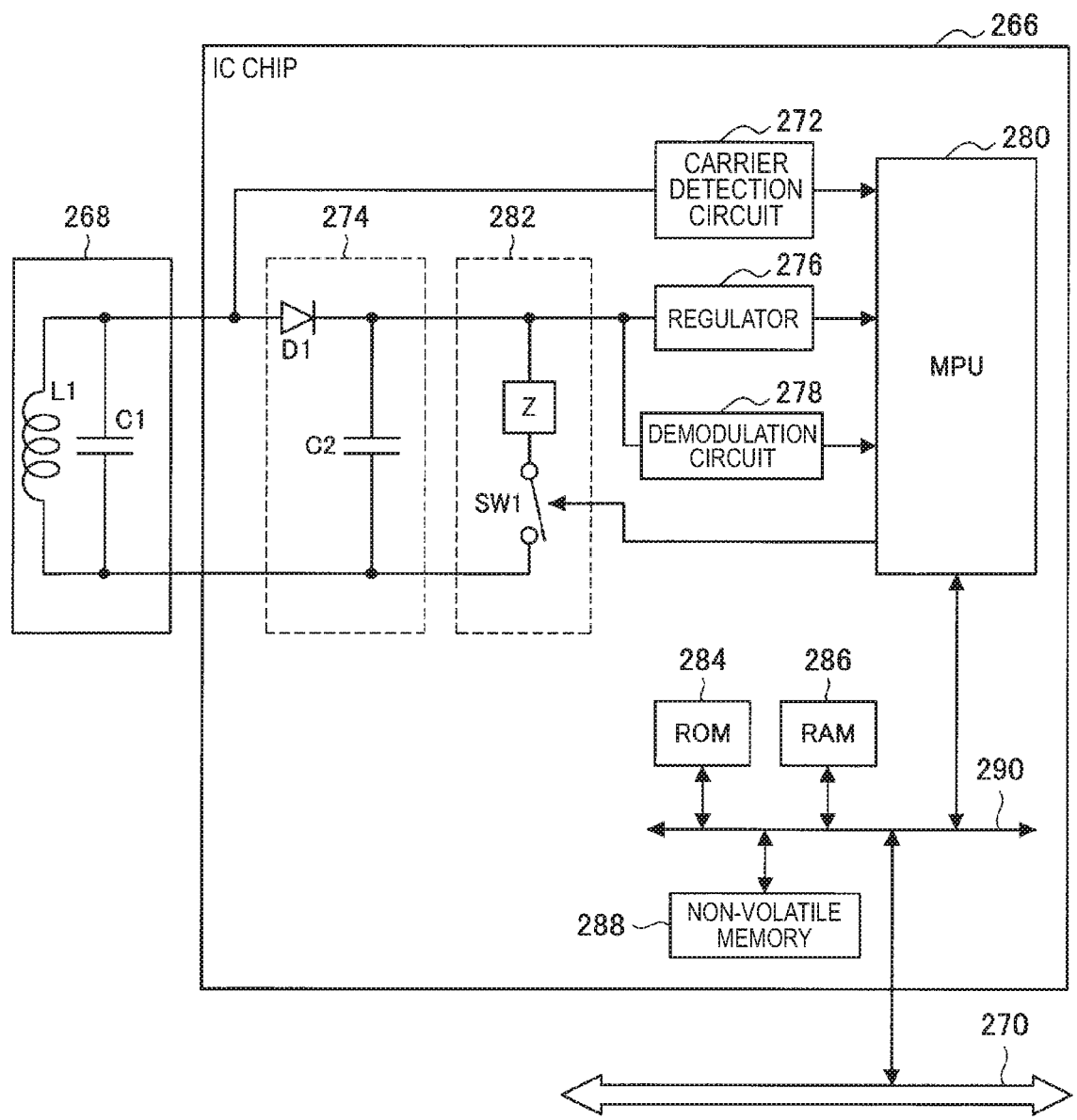
FIG. 7 is an explanatory diagram illustrating an example of a configuration of an IC chip and an antenna illustrated in FIG. 6.

FIG. 7 is an explanatory diagram illustrating an example of a configuration of the IC chip 266 and the antenna 268 illustrated in FIG. 6. Note that the information processing device 200 may not have, for example, the configuration of the IC chip 266 illustrated in FIG. 6 in the form of an IC chip.

The antenna 268 includes, for example, a resonance circuit including a coil (inductor) L1 having a predetermined inductance and a capacitor C1 having a predetermined electrostatic capacity, and causes an induced voltage to be generated through electromagnetic induction in accordance with reception of a carrier. In addition, the antenna 268 outputs a reception voltage obtained by causing the induced voltage to resonate at a predetermined resonance frequency. Here, the resonance frequency of the antenna 268 is set in accordance with a frequency of a carrier, for example, like a frequency of 13.56 [MHz], or the like. With the above-described configuration, the antenna 268 receives carriers and transmits response signals using load modulation performed by the load modulation circuit 282 included in the IC chip 266.

The IC chip 266 includes a carrier detection circuit 272, a detector circuit 274, a regulator 276, a demodulation circuit 278, an MPU 280, and the load modulation circuit 282. Note that, although not illustrated in FIG. 18, the IC chip 266 may further include, for example, a protection circuit (which is not illustrated) for preventing an overvoltage or an overcurrent from being applied to the MPU 280. Here, as the protection circuit (which is not illustrated), for example, a clamp circuit including a diode, or the like is exemplified.

In addition, the IC chip 266 includes, for example, a ROM 284, a RAM 286, and a non-volatile memory 288. The MPU 280, the ROM 284, the RAM 286, and the non-volatile memory 288 are connected by, for example, a bus 290 serving as a data transmission path. Furthermore, the bus 290 is connected to the bus 270.

The ROM 284 stores control data such as programs and arithmetic parameters to be used by the MPU 280. The RAM 286 temporarily stores a program to be executed by the MPU 280, arithmetic results, execution states, and the like.

The non-volatile memory 288 stores various kinds of data, for example, encryption key information used for mutual authentication in communication in the second communication scheme, electronic values (money or data having a value equivalent to money; which can be referred to as "electronic money" below), various applications and the like. Here, as the non-volatile memory 288, for example, erasable and programmable read only memory (EEPROM), a flash memory, or the like is exemplified. The non-volatile memory 288 has, for example, tamper resistance, and corresponds to an example of the secure recording medium.

The carrier detection circuit 272 generates, for example, a rectangular detection signal on the basis of a reception voltage conveyed from the antenna 268 and conveys the detection signal to the MPU 280. In addition, the MPU 280 uses the above-described conveyed detection signal as, for example, a processing clock for data processing. Here, since the above-described detection signal is based on the reception voltage conveyed from the antenna 268, the detection signal is synchronized with the frequency of a carrier transmitted from an external device such as the reader/writer. Thus, the IC chip 266 can perform a process to be performed between the IC chip 266 and an external device such as the reader/writer in synchronization with the external device since the IC chip includes the carrier detection circuit 272.

The detector circuit 274 rectifies the reception voltage output from the antenna 268. Here, the detector circuit 274 includes, for example, a diode D1 and a capacitor C2.

The regulator 276 smoothens the reception voltage such that the reception voltage becomes a constant voltage, and outputs a drive voltage to the MPU 280. Here, the regulator 276 uses DC components of the reception voltage as a drive voltage.

The demodulation circuit 278 demodulates a carrier signal on the basis of the reception voltage, and outputs data (e.g., binarized data signals of a high level and a low level) corresponding to the carrier signal included in the carrier. Here, the demodulation circuit 278 outputs AC components of the reception voltage as data.

The MPU 280 is driven using the drive voltage output from the regulator 276 as a power source, and processes the data demodulated by the demodulation circuit 278. Here, the MPU 280 includes, for example, one or two or more processors, various processing circuits, and the like including arithmetic circuits such as MPUs.

In addition, the MPU 280 selectively generates a control signal for controlling load modulation relating to a response to an external device such as the reader/writer in accordance with a process result. Then, the MPU 280 selectively outputs the control signal to the load modulation circuit 282.

The load modulation circuit 282 includes, for example, a load Z and a switch SW1, and performs load modulation by selectively connecting the load Z (making the load Z active) in accordance with the control signal conveyed from the MPU 280. Here, the load Z includes, for example, a resistor having a predetermined resistance value. In addition, the switch SW1 includes, for example, a p-channel metal oxide semiconductor field effect transistor (MOSFET) or an n-channel MOSFET.

With the above-described configuration, the IC chip 266 can process the carrier signal received by the antenna 268 and can cause the antenna 268 to transmit a response signal using load modulation.

The IC chip 266 and the antenna 268 perform communication based on NFC with an external device such as the reader/writer using a carrier having a predetermined frequency, for example, by having the configuration illustrated in FIG. 7. Note that it is needless to say that the configuration of the IC chip 266 and the antenna 268 according to the present embodiment is not limited to the example illustrated in FIG. 7.

The information processing device 200 performs the process relating to the other information processing method according to the later-described embodiment using, for example, the configuration illustrated in FIG. 6. Note that a hardware configuration of the information processing device 200 according to the present embodiment is not limited to the configuration illustrated in FIG. 6.

For example, the information processing device 200 may not include the communication interface 264 in a case in which the information processing device performs first communication with an external device via a connected external communication device that can perform communication in the first communication scheme.

In addition, the information processing device 200 may include the carrier transmission circuit 166 and the antenna 168 illustrated in FIG. 4, for example, instead of the IC chip 266 and the antenna 268 illustrated in FIG. 6. The information processing device 200 can also further include the carrier transmission circuit 166 and the antenna 168 illustrated in FIG. 4 and employ a configuration with a reader/writer function for NFC.

Furthermore, in a case in which communication in the second communication scheme is not NFC, the information processing device 200 may not include the IC chip 266 and the antenna 268. In addition, in the case in which communication in the second communication scheme is not NFC, the information processing device 200 further includes a communication device that supports communication in the second communication scheme, such as an infrared communication device.

In addition, the information processing device 200 may not include a communication device that supports communication in the second communication scheme, such as the IC chip 266 and the antenna 268, in a case in which the information processing device performs communication in the second communication scheme with an external device via a connected external communication device that can perform communication in the second communication scheme.

Furthermore, the information processing device 200 may further include other communication devices, for example, a communication antenna such as an antenna for LTE/3G and an RF circuit or the like.

In addition, the information processing device 200 may further include a sensor, for example, a GNSS device, an acceleration sensor.

Furthermore, the information processing device 200 may employ a configuration in which, for example, one or two or more of the recording medium 256, an operation input device 260, and the display device 262 are not included.

In addition, the configuration illustrated in FIG. 6 (or a configuration according to a modified example), for example, may be realized by one or two or more ICs.

Referring to FIG. 5 again, an example of the configuration of the information processing device 200 will be described. The first communication unit 202 performs communication with an external device using communication in the first communication scheme. First communication of the first communication unit 202 is controlled by, for example, the control unit 206 (more specifically, for example, the processing unit 210).

Here, as the first communication unit 202, for example, an IEEE 802.15.1 port and a transmission/reception circuit, an IEEE 802.11 port and a transmission/reception circuit, or the like is exemplified.

The second communication unit 204 performs communication with an external device through communication in the second communication scheme. The communication of the second communication unit 204 in the second communication scheme is controlled by, for example, the control unit 206 (more specifically, for example, the processing unit 210).

Here, as the second communication unit 204, for example, a communication device that supports NFC such as IC chip 266 and the antenna 268 illustrated in FIG. 6, an infrared communication device, or the like is exemplified.

The control unit 206 is constituted by, for example, an MPU and the like, and plays a role of controlling the information processing device 200 overall. In addition, the control unit 206 includes, for example, the processing unit 210 and plays a leading role of performing the process relating to another information processing method according to the present embodiment.

The processing unit 210 plays a leading role of performing the process relating to the other information processing method according to the present embodiment. The processing unit 210 performs an execution control process introduced in (I) described below, for example, as the process relating to the other information processing method according to the present embodiment.

(I) Execution Control Process

When communication with a communication target device is established, the processing unit 210 determines a state of the communication with the communication target device.

Here, as the communication with the communication target device, communication in the first communication scheme is exemplified. Note that an execution control process relating to the other information processing method according to the present embodiment can be applied to communication in a communication scheme other than the first communication scheme, such as communication in the second communication scheme.

Then, the processing unit 210 does not perform a process based on a request transmitted from the communication target device on the basis of the determination result even in a case in which the request transmitted from the communication target device is acquired.

Here, as the state of the communication according to the present embodiment, for example, communication strength of the communication or a communication distance of the communication is exemplified. The processing unit 210 realizes not to perform a process based on the request transmitted from the communication target device based on the determination result by performing, for example, any process among processes introduced in (i) to (iii) described below.

(i) Case in which State of Communication Refers to Communication Strength of Communication The processing unit 210 acquires communication strength of communication with the communication target device by, for example, measuring signal strength of a signal transmitted from the communication target device using an RSSI included in the information processing device 200, an external RSSI connected to the information processing device 200 or the like. Note that the processing unit 210 may acquire communication strength of communication with the communication target device using an arbitrary method which enables communication strength of the communication to be acquired, such as a method of estimating communication strength.

Then, in a case in which the acquired communication strength has a value smaller than a predetermined threshold value or the communication strength has a value equal to or smaller than the predetermined threshold value, for example, the processing unit 210 does not perform the process based on the request transmitted from the communication target device. Here, as the predetermined threshold value relating to the communication strength, for example, a fixed threshold value set in advance, or a variable threshold value that can be adjusted on the basis of a user operation or the like is exemplified. In addition, the predetermined threshold value relating to the communication strength may be dynamically set using, for example, an algorithm for dynamically changing the threshold value on the basis of a measurement result of a pattern of the communication strength.

(ii) Case in which State of Communication in First Communication Scheme Refers to a Communication Distance The processing unit 210 acquires a communication distance by, for example, estimating the communication distance on the basis of a signal strength of a signal transmitted from the communication target device in communication. In addition, the processing unit 210 may acquire a communication distance using an arbitrary method in which the communication distance can be acquired, for example, a "method of estimating a communication distance on the basis of a time from when a signal is transmitted to the communication target device in communication to when a response signal transmitted from the communication target device is received."

Then, in a case in which the acquired communication distance has a value greater than a predetermined threshold value or the communication distance has a value greater than or equal to the threshold value, for example, the processing unit 210 does not perform the process based on the request transmitted from the communication target device. Here, as the predetermined threshold value for the communication distance, for example, a pre-set fixed threshold value or a variable threshold value that can be adjusted on the basis of a user operation or the like is exemplified.

(iii)

The processing unit 210 can also realize not to perform the process based on the request transmitted from the communication target device on the basis of the determination result by combining the process introduced in (i) described above and the process introduced in (ii) described above.

The processing unit 210 does not perform the process based on the request transmitted from the communication target device even in a case in which the request transmitted from the communication target device is acquired in, for example, "the case in which the acquired communication strength is smaller than the predetermined threshold value or the case in which the acquired communication distance is shorter than the predetermined threshold value." Note that it is needless to say that an example of the process in which the process introduced in (i) described above and the process introduced in (ii) described above are combined is not limited to the above-described example.

The processing unit 210 realizes not to perform the process based on the request transmitted from the communication target device on the basis of the determination result by, for example, performing any of the process introduced in (ii) described above to the process introduced in (iii) described above as the execution control process.

Note that an execution control process relating to the other information processing method according to the present embodiment is not limited to the above-described example.

For example, the processing unit 210 may determine a predetermined action performed by a user of the information processing device 200 and not perform the process based on the request transmitted from the communication target device on the basis of the determination result about the predetermined action.

Here, as the predetermined action relating to the execution control process, one or two or more arbitrary actions that can be detected by the information processing device 200, for example, a specific operation (e.g., pressing a button or the like) performed with respect to an operation unit (which is not illustrated) of the information processing device 200, a specific operation (e.g., pressing a button or the like) performed with respect to an external device such as a remote controller, an action of moving the information processing device 200, a combination thereof, and the like are exemplified.

In a case in which an operation signal indicating a specific operation acquired from the operation unit (which is not illustrated) is detected, for example, the processing unit 210 determines that the predetermined action has been performed.

In addition, the processing unit 210 detects movement of the information processing device 200 on the basis of one or both of motion information and position information transmitted from, for example, a sensor included in the information processing device 200 or an external sensor connected to the information processing device 200. Then, the processing unit 210 determines that the predetermined action has been performed in a case in which movement of the information processing device 200 is detected.

In the case in which the predetermined action is determined to have been performed, for example, the processing unit 210 does not perform a process based on a request acquired after the determination transmitted from the communication target device.

Furthermore, the processing unit 210 can neither perform a process based on a request transmitted from the communication target device on the basis of, for example, a combination of a determination result of a state of communication with the communication target device and a determination result of the predetermined action performed by a user of the information processing device 200.

As an example, in a case in which communication strength of communication with the communication target device is smaller than the predetermined threshold value or the predetermined action is determined to have been performed, for example, the processing unit 210 does not perform a process based on a request transmitted from the communication target device.

By including the processing unit 210, for example, the control unit 206 plays a leading role of performing a process relating to the other information processing method according to the present embodiment (e.g., the above-described process (I) (execution control process).

The information processing device 200 performs the process relating to the other information processing method according to the present embodiment (e.g., the above-described process (I) (execution control process)) using, for example, the configuration illustrated in FIG. 5.

Here, the information processing device 200 may not perform a process based on a request transmitted from the communication target device after communication with the communication target device is established on the basis of one or both of a determination result of a state of communication with the communication target device and a determination result of the predetermined action performed by a user of the information processing device 200.

Therefore, the information processing device 200 can block access from the communication target device, for example, using the configuration illustrated in FIG. 5, for example, even after pairing. As an example of the information processing system 1000 illustrated in FIG. 1, for example, the information processing device 200 playing a role of Peripheral can block access from the information processing device 100 playing a role of Central even after pairing.

The information processing device 200 according to the present embodiment can be applied to various devices that can perform a process relating to the other information processing method according to the present embodiment, for example, a communication device such as a smartphone, an arbitrary wearable device used worn in the body of a user, such as a watch type device, or the like. In addition, the present embodiment can also be applied to, for example, a processing IC that can be incorporated into the above-described device.

[3] Use Cases to which Information Processing Method According to Present Embodiment and Other Information Processing Method According to Present Embodiment can be Applied Next, use case examples to which the above-described information processing method according to the present embodiment and the above-described other information processing method according to the present embodiment will be introduced.

FIGS. 8A, 8B, 8C, and 8D are explanatory diagrams illustrating examples of use cases to which the information processing method according to the present embodiment and the other information processing method according to the present embodiment can be applied.

Here, FIGS. 8A, 8B, 8C, and 8D illustrate an example in which the information processing device 100 playing a role of Central in BLE (an example of communication in the first communication scheme; the same applies below) is an "automobile" and the information processing device 200 playing a role of Peripheral in BLE is an "information processing terminal." Here, in the use cases illustrated in FIGS. 8A, 8B, 8C, and 8D, for example, a smartphone, an arbitrary wearable device used worn in the body of a user, such as a watch type device, or the like is exemplified as the information processing device 200.

Figure 8A:
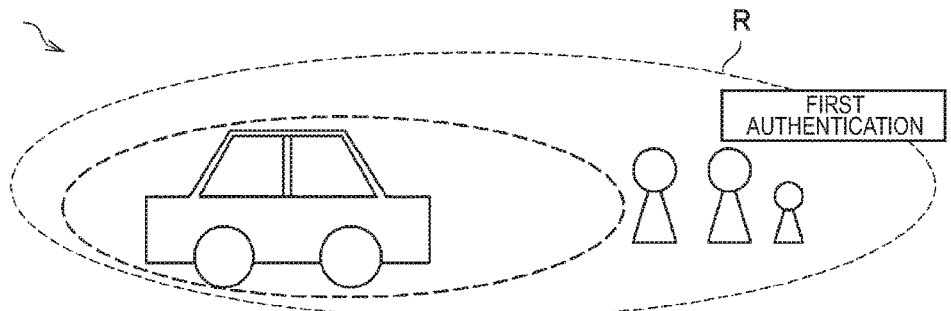
FIGS. 8A, 8B, 8C, and 8D are explanatory diagrams illustrating examples of use cases to which the information processing method according to the embodiment and another information processing method according to the embodiment can be applied.
Figure 8B:
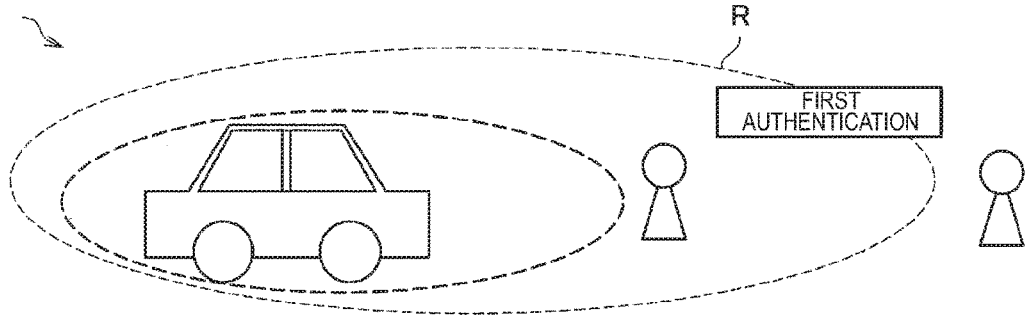
Figure 8C:
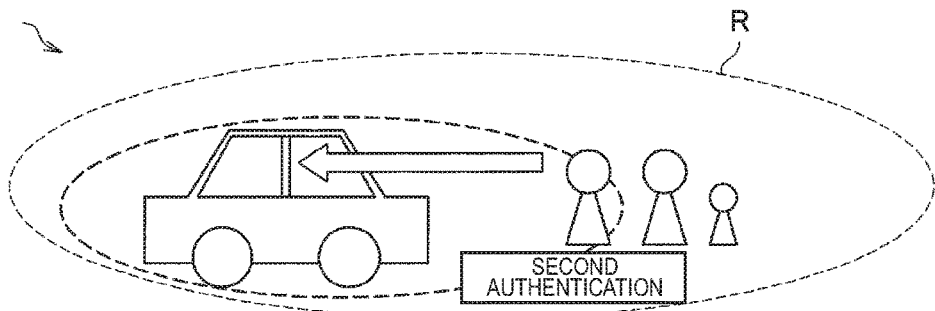
Figure 8D:
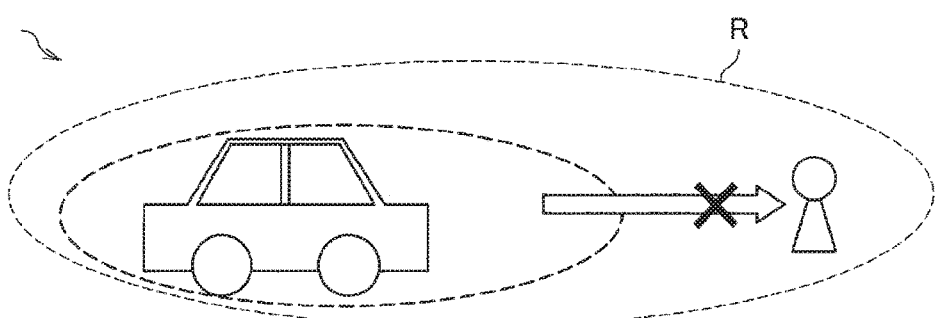

FIGS. 8A, 8B, and 8C illustrate examples of use cases in a case in which the information processing device 100 performs the process relating to the above-described information processing method according to the present embodiment. In addition, FIG. 8D illustrate a use case example in a case in which the information processing device 200 performs the process relating to the above-described other information processing method according to the present embodiment.

Overviews of the use cases illustrated in FIGS. 8A, 8B, 8C, and 8D and examples of processes for realizing the use cases will be described below. A case in which a process for realizing each use case is performed by each device constituting the information processing system 1000 illustrated in FIG. 1 will be exemplified below.

Note that it is needless to say that a use case to which the information processing method according to the present embodiment can be applied and a use case to which the information processing method according to the present embodiment can be applied are not limited to the use cases described with reference to FIGS. 8A, 8B, 8C, and 8D.

[3-1] First Example of Use Case (Use Case Illustrated in FIG. 8A)

First, a use case illustrated in FIG. 8A will be described as a first example of a user case.

[3-1-1] Overview of Use Case According to First Example

When an automobile (an example of the information processing device 100; the same applies to the present use case described below) detects an information processing terminal (an example of the information processing device 200; the same applies to the present use case described below) that belongs to a specific group such as a family, for example, the automobile notifies a user thereof of the detection.

The automobile notifies the user of the fact that the information processing terminal has been detected using a visual method of, for example, turning on hazard lights, headlights, or the like of the automobile, displaying an image or the like on a display screen of the information processing terminal, combining the two operations, or the like. In addition, the automobile may notify the user of the fact that the information processing terminal has been detected using an auditory method of, for example, sounding a horn, outputting sound (including music) from an audio output device included in the information processing terminal such as a speaker, combining the two operations, or the like. The automobile can notify the user of the fact that the information processing terminal has been detected using an arbitrary method in which the user can be notified of the fact that the information processing terminal has been detected, for example, a combined method of a visual method and an auditory method, or the like.

By the automobile giving the above-described notification, the user of the information processing terminal can recognize the target automobile.

By performing the above-described process (1) (communication establishment process), the automobile authenticates the information processing terminal and then establishes a communication path using BLE. Here, first authentication illustrated in FIG. 8A corresponds to authentication relating to the first example introduced in (A) described above in the above-described process (1) (communication establishment process).

Then, when the automobile performs the above-described process (2) (execution process), the key of a door of the automobile is unlocked. Here, the key of the door of the automobile is unlocked since the automobile uses data acquired from a secure recording medium included in the information processing terminal.

[3-1-2] Process Relating to Use Case According to First Example

Figure 10:
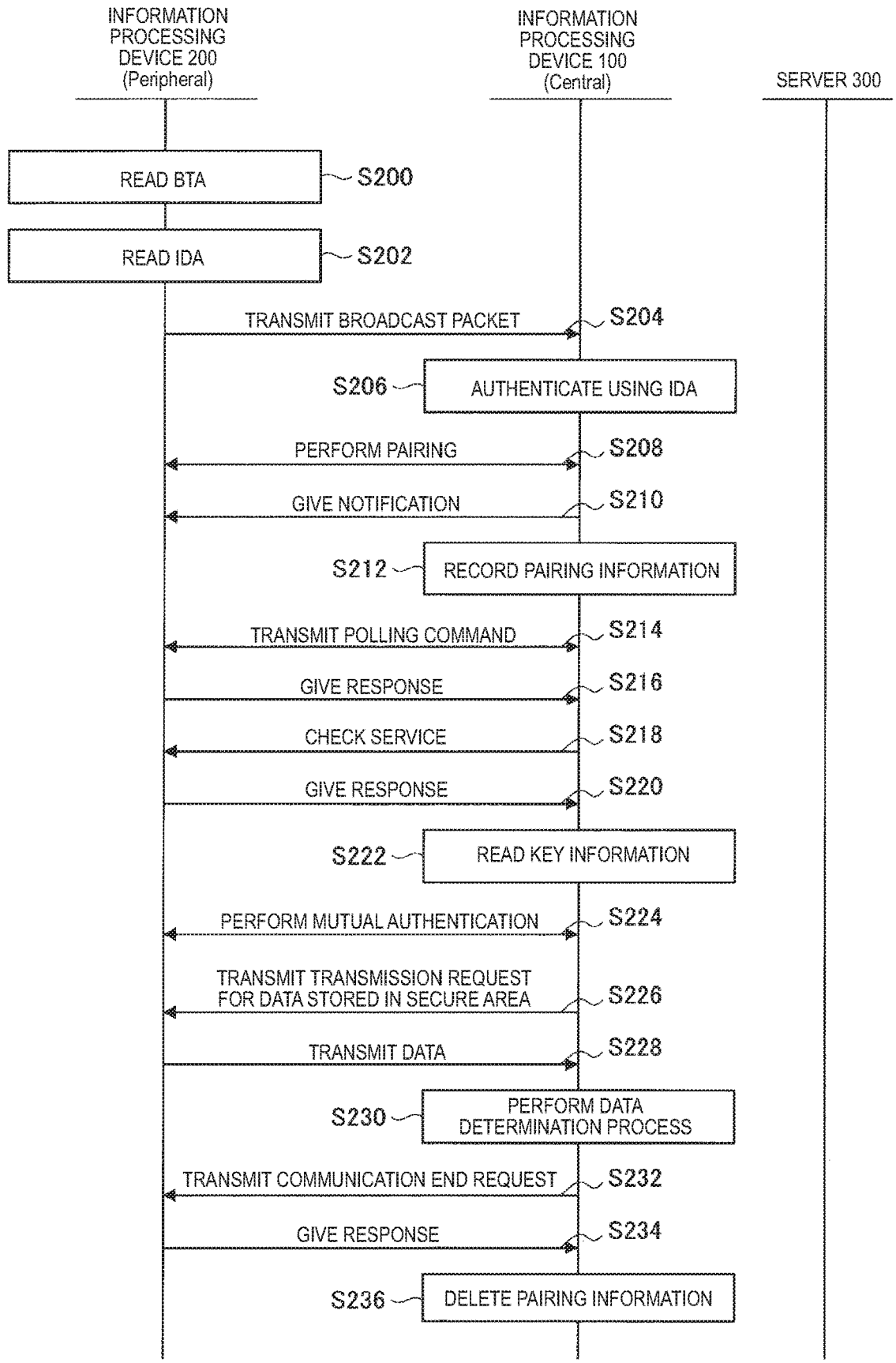
FIG. 10 is an explanatory diagram illustrating an example of another process relating to the first use case to which the information processing method according to the embodiment can be applied.

FIG. 9 and FIG. 10 are explanatory diagrams illustrating examples of processes relating to a first use case to which the information processing method according to the present embodiment can be applied. FIG. 9 shows an example of a pre-process performed to realize the use case according to the first example. In addition, FIG. 10 illustrates an example of another process relating to the user case according to the first example.

First, the pre-process performed for realizing the use case according to the first example will be described with reference to FIG. 9. Note that the pre-process shown in FIG. 9 can also be performed in other use cases such as a use case according to a second example which will be described below or the like.

The server 300 transmits IDA (an example of identification information; the same applies below) corresponding to the information processing device 200 that is a communication target of the information processing device 100 using BLE, a passkey used for pairing, and service type information to the information processing device 100 (S100). The server 300 performs the process of Step S100 in a case in which, for example, a user of the information processing device 200 or the like registers various information in the server 300.

The information processing device 100 that has received various information transmitted from the server 300 in Step S100 records the received various information in a recording medium such as a storage unit (which is not illustrated) or the like (S102). Then, the information processing device 100 gives a response that the various information transmitted from the server 300 in Step S100 has been acquired normally to the server 300 (S104). In addition, the information processing device 100 gives a response that an error has occurred in Step S104 in a case in which any error, like abnormal reception of the various information transmitted from the server 300 in Step S100, occurs.

The server 300 that has received the response that the various information has been received normally transmitted from the information processing device 100 in Step S104 transmits key information (e.g., a service storing the key and data indicating a value of the key) and an IDB for accessing the secure recording medium corresponding to the information processing device 200 (S106). Here, the IDB is an example of data corresponding to key information stored in an area of the secure recording medium.

In addition, the server 300 that has received the response that an error had occurred transmitted from the information processing device 100 in Step S104, for example, performs the processes from Step S100.

The information processing device 100 that has received various information transmitted from the server 300 in Step S106 records the received various information in a recording medium such as a storage unit (which is not illustrated) or the like (S108). Then, the information processing device 100 gives a response that the various information transmitted from the server 300 in Step S106 has been acquired normally to the server 300 (S1010). In addition, the information processing device 100 gives a response that an error has occurred in Step S110 in a case in which any error, like abnormal reception of the various information transmitted from the server 300 in Step S106, occurs.

Since the processes illustrated in FIG. 9 are performed, for example, information to be used for realizing the use case illustrated in FIG. 8A or the like is stored in the storage unit (which is not illustrated) of the information processing device 100.

Note that it is needless to say that a pre-process performed to realize the use case according to the first example is not limited to the example illustrated in FIG. 9.

Next, an example of another process relating to the use case according to the first example will be described with reference to FIG. 10.

The information processing device 200 reads BTA that is unique information for access in BLE from a recording medium such as a storage unit (which is not illustrated) (S200). In addition, the information processing device 200 reads IDA from the recording medium such as the storage unit (which is not illustrated) (S202).

The information processing device 200 transmits a broadcast packet including the BTA and the IDA read from the recording medium in Steps S200 and S202 using BLE by broadcast (S204).

Figure 11:
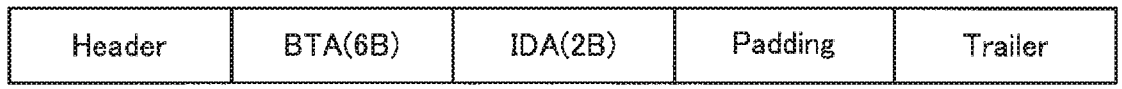
FIG. 11 is an explanatory diagram for describing an example of a process relating to the first use case to which the information processing method according to the embodiment can be applied.

FIG. 11 is an explanatory diagram for describing the example of the process relating to the first use case to which the information processing method according to the present embodiment can be applied, showing an example of "advertising packet (an example of the broadcast packet) transmitted by broadcast by the information processing device 200. The "BTA" illustrated in FIG. 11 corresponds to the BTA read from the recording medium in Step S200. In addition, the "IDA" shown in FIG. 11 corresponds to the IDA read from the recording medium in Step S202.

The information processing device 200 periodically or non-periodically transmit the broadcast packet illustrated in FIG. 11, for example, in Step S204 using BLE by broadcast. Note that it is needless to say that a configuration of the broadcast packet according to the present embodiment is not limited to the example illustrated in FIG. 11.

The example of the process relating to the use case according to the first example will be described referring to FIG. 10 again. The information processing device 100 that has received the broadcast packet transmitted by broadcast in Step S204 authenticates the information processing device 200 using the IDA included in the broadcast packet and the IDA stored in the recording medium such as the storage unit (which is not illustrated) (S206). Here, the process of Step S206 corresponds to authentication relating to the first example introduced in (A) described above in the above-described process (1) (communication establishment process).

In a case in which the authentication is not completed in Step S206, the information processing device 100 does not perform processes from Step S208.

In addition, in a case in which the authentication is completed in Step S206, the information processing device 100 performs a process for pairing of BLE with the information processing device 200 using a passkey corresponding to the IDA stored in the recording medium such as the storage unit (which is not illustrated) (S208).

When pairing is completed in Step S208, the information processing device 100 gives notification of the fact that the process for pairing has been completed normally using one or both of an image and a sound or the like (S210).

With pairing completed in Step S208, a communication path based on BLE is established between the information processing device 100 and the information processing device 200. In addition, the information processing device 100 and the information processing device 200 perform communication using the established communication path of BLE.

When pairing is completed in Step S208, the information processing device 100 records information relating to pairing in the recording medium such as the storage unit (which is not illustrated) (S212).

The information processing device 100 transmits a polling command of NFC (an example of communication in the second communication scheme; the same applies below) using the established communication path of BLE (S214).

The information processing device 200 that has received the polling command transmitted from the information processing device 100 in Step S214 gives a response corresponding to the polling command (S216).

The information processing device 100 that has received the response transmitted from the information processing device 200 in Step S216 checks whether a service corresponding to the IDB stored in the recording medium such as the storage unit (which is not illustrated) has been registered in the information processing device 200 (S218). In Step S218, the information processing device 100 transmits, for example, the IDB and a service checking request including an instruction to cause whether or not the service corresponding to the IDB has been registered to be determined.

The information processing device 200 that has received the service checking request transmitted from the information processing device 100 in Step S218 gives a response indicating a processing result of the service checking request (S220).

In a case in which the response transmitted from the information processing device 200 in Step S220 does not indicate that the service corresponding to the IDB has been registered, the information processing device 100 does not perform processes from Step S222, for example.

In addition, in a case in which the response transmitted from the information processing device 200 in Step S220 indicates that the service corresponding to the IDB has been registered, the information processing device 100 reads key information stored in the recording medium such as the storage unit (which is not illustrated) (S222). Then, the information processing device 100 performs mutual authentication for accessing the secure recording medium included in the information processing device 200 using the key information (S224).

When the mutual authentication is completed in Step S224, the information processing device 100 transmits a data transmission request including a data transmission instruction, the data being stored in a secure area of the secure recording medium (S226). Here, the data transmission request of Step S226 corresponds to a data transmission request for causing information to be used in a process of NFC (an example of information to be used in a process to be performed in communication in the second communication scheme) to be transmitted.

The information processing device 200 that has received the data transmission request transmitted from the information processing device 100 in Step S226 reads data corresponding to the data transmission request from the secure recording medium and transmits the data to the information processing device 100 (S228).

The information processing device 100 that has received the data transmitted from the information processing device 200 in Step S228 determines whether or not the received data is desired data, and processes the received data in a case in which the received data is desired data (S230). By performing the process of Step S230, unlocking of the key of the door of the automobile illustrated with reference to FIG. 8A or the like is realized.

Here, the data transmitted from the information processing device 200 in Step S228 corresponds to information to be used in a process of NFC. Thus, the process of Step S230 corresponds to an example of a process using the information to be used in a process of NFC, i.e., a process performed using the information to be used in a process to be performed in communication in the second communication scheme. That is, the process of Step S230 corresponds to an example of the above-described process (2) (execution process).

In addition, in a case in which the received data is not desired data, the information processing device 100 does not process the received data and ends the process performed with the information processing device 200.

When the process performed with the information processing device 200 using the information to be used in a process of NFC ends, the information processing device 100 transmits a communication end request including an instruction to terminate communication based on BLE (S232).

The information processing device 200 that has received the communication end request from the information processing device 100 in Step S232 gives a response that communication based on BLE will be ended (S234).

The information processing device 100 that has received the response transmitted from the information processing device 200 in Step S216 deletes the information relating to pairing recorded in the recording medium in Step S212 from the recording medium (S236).

By performing the process illustrated in FIG. 10, for example, the use case according to the first example illustrated in FIG. 8A is realized.

Note that an example of a process that enables the use case according to the first example to be realized is not limited to the example illustrated in FIG. 10.

In a case in which the information processing device 200 moves out of a communicable range of BLE or the like and thus communication with the information processing device 200 based on BLE is not possible after the information processing device 100 receives the response in Step S220 of FIG. 10, for example, the information processing device 100 invalidates the authentication results obtained from authentication of the information processing device 200 in the process of Step S206, the process of Step S224, or the like. With the invalidated authentication result, if communication with the information processing device 100 based on BLE is not established again, the information processing device 200 is not possible to perform communication with the information processing device 100 based on BLE.

In addition, in the case in which the data transmitted in Step S228 of FIG. 10 is received, the information processing device 100 can also cause data to be written in, for example, another area or the like of the secure recording medium included in the information processing device 200.

As the data to be written by the information processing device 100 in another area or the like of the secure recording medium, for example, various kinds of data that corresponds to a reward for the data transmitted in Step S228 such as data indicating a coupon, data for adding an electronic value, and the like are exemplified. Note that it is needless to say that data to be written by the information processing device 100 in another area or the like of the secure recording medium is not limited to the data corresponding to a reward for the data transmitted in Step S228.

In addition, even in a case in which either or both of a plurality of information processing devices 100 playing a role of Central in BLE and a plurality of information processing devices 200 100 playing a role of Peripheral in BLE are present, for example, one information processing device 100 and one information processing device 200 can perform a similar process (including a process according to a modified example) to that of FIG. 10 therebetween. Furthermore, in a case in which a plurality of information processing devices 200 are present as described above, the information processing device 100 can also change a process to be executed on the basis of a combination of information to be used in a process to be performed in communication in the second communication scheme acquired from each of the plurality of information processing devices 200 (communication target devices).

[3-2] Second Example of Use Case (Use Case Illustrated in FIG. 8B)

Next, a use case illustrated in FIG. 8B will be described as a second example of the use case.

[3-2-1] Overview of Use Case According to Second Example

An automobile (an example of the information processing device 100; the same applies to the present use case below) performs the above-described process (1) (communication establishment process) when, for example, an information processing terminal (am example of the information processing device 200; the same applies to the present use case below), authenticates the information processing terminal by determining a service supported by the information processing terminal, and then establishes a communication path based on BLE. Here, first authentication illustrated in FIG. 8B corresponds to the second example introduced in (B) described above in the above-described process (1) (communication establishment process).

As an example, in a case in which a car sharing service is provided with the automobile and the information processing terminal supports both a car sharing registration service and a payment service, for example, the automobile establishes a communication path based on BLE.

Then, in a case in which the service supported by the information processing terminal corresponds to a service provided by the automobile (e.g., a case in which a service provided by the automobile is registered in the information processing terminal or the like), the automobile performs the above-described process (2) (execution process) to unlock the key of a door of the automobile.

Here, the automobile unlocks the key of the door using data acquired from the secure recording medium included in the information processing terminal. In addition, in the above-described process (2) (execution process), the automobile performs a payment process using the data acquired from the secure recording medium included in the information processing terminal, and in a case in which the payment process is completed normally, the key of the door of the automobile may be unlocked.

Furthermore, in a case in which the service supported by the information processing terminal does not correspond to the service provided with the automobile (e.g., a case in which the service provided with the automobile is not registered in the information processing terminal or the like), the automobile does not unlock the key of the door of the automobile.

[3-2-2] Process Relating to Use Case According to Second Example

Figure 12:
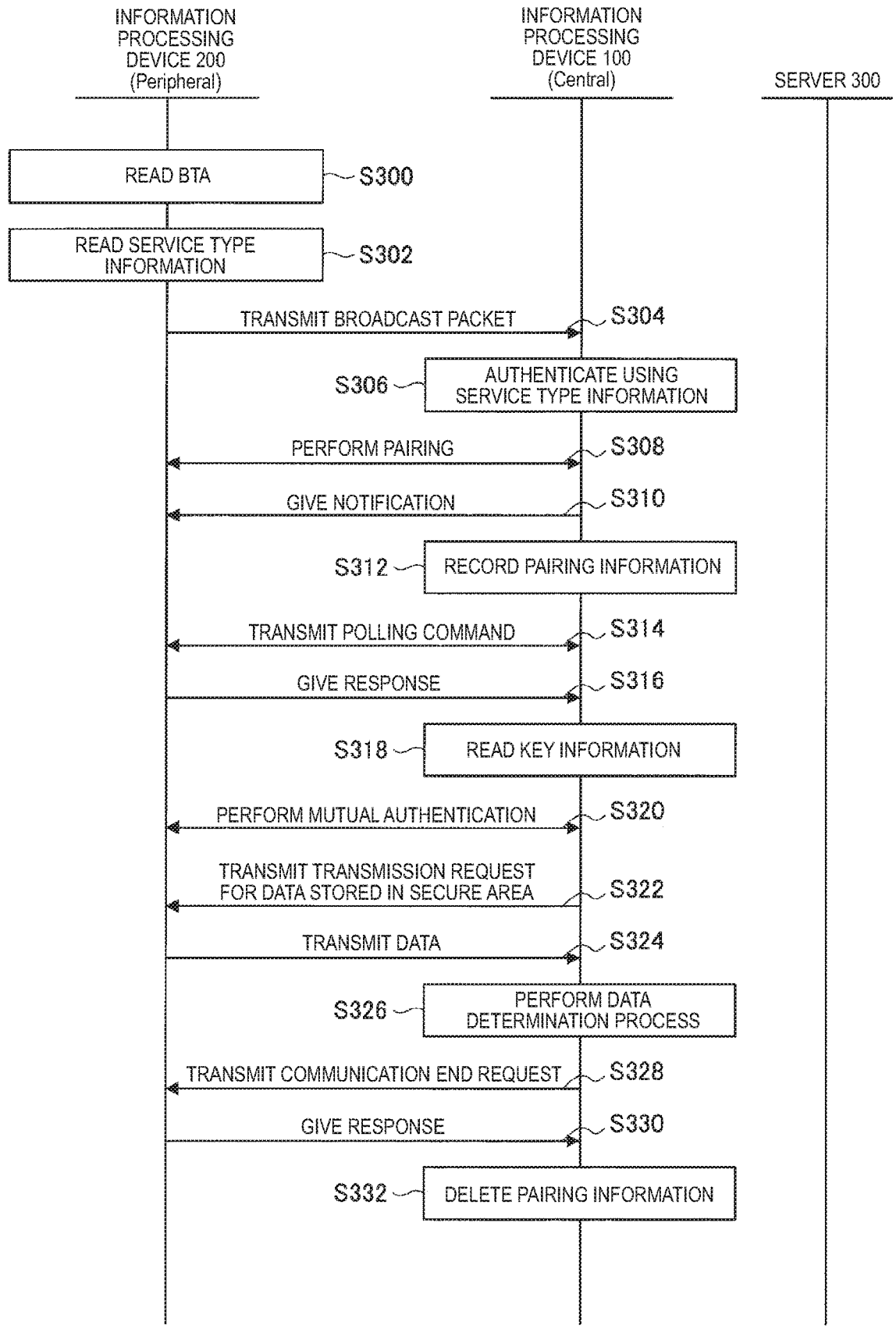
FIG. 12 is an explanatory diagram illustrating an example of a process relating to a second use case to which the information processing method according to the embodiment can be applied.

FIG. 12 is an explanatory diagram illustrating an example of a process relating to a second use case to which the information processing method according to the present embodiment can be applied.

The information processing device 200 reads BTA that is unique information for access in BLE from a recording medium such as a storage unit (which is not illustrated) (S300). In addition, the information processing device 200 reads service type information from the recording medium such as the storage unit (which is not illustrated) (S302).

The information processing device 200 transmits a broadcast packet including the BTA and the service type information read from the recording medium in Steps S300 and S302 using BLE by broadcast (S304).

FIG. 13 is an explanatory diagram for describing the example of the process relating to the second use case to which the information processing method according to the present embodiment can be applied, showing an example of "advertising packet (an example of the broadcast packet) transmitted by broadcast by the information processing device 200. The "BTA" illustrated in FIG. 13 corresponds to the BTA read from the recording medium in Step S300. In addition, the "service type information" shown in FIG. 13 corresponds to the service type information read from the recording medium in Step S302.

The information processing device 200 periodically or non-periodically transmit the broadcast packet illustrated in FIG. 13, for example, in Step S304 using BLE by broadcast. Note that it is needless to say that a configuration of the broadcast packet according to the present embodiment is not limited to the example illustrated in FIG. 13.

The example of the process relating to the use case according to the second example will be described referring to FIG. 12 again. The information processing device 100 that has received the broadcast packet transmitted by broadcast in Step S304 authenticates the information processing device 200 using the service type information included in the broadcast packet and the service type information stored in the recording medium such as the storage unit (which is not illustrated) (S306). Here, the process of Step S206 corresponds to authentication relating to the second example introduced in (B) described above in the above-described process (1) (communication establishment process).

In a case in which the service indicated by the acquired service type information coincides with the service indicated by the service type information stored in the recording medium, for example, the information processing unit 100 determines that the information processing device 200 has been authenticated. In addition, in a case in which the acquired service type information indicates a plurality of services and some of the services coincide with the service, the information processing unit 100 can determine that the information processing device 200 has been authenticated as well.

In a case in which the authentication is not completed in Step S306, the information processing device 100 does not perform processes from Step S308.

In addition, in a case in which the authentication is completed in Step S306, the information processing device 100 performs a process for pairing of BLE with the information processing device 200 using a passkey corresponding to the information processing device 200 stored in the recording medium such as the storage unit (which is not illustrated) (S208).

When pairing is completed in Step S308, the information processing device 100 gives notification of the fact that the process for pairing has been completed normally using one or both of an image and a sound or the like (S310).

With pairing completed in Step S308, a communication path based on BLE is established between the information processing device 100 and the information processing device 200. In addition, the information processing device 100 and the information processing device 200 perform communication using the established communication path of BLE.

When pairing is completed in Step S308, the information processing device 100 records information relating to pairing in the recording medium such as the storage unit (which is not illustrated) (S312).

The information processing device 100 transmits a polling command of NFC (an example of communication in the second communication scheme; the same applies below) using the established communication path of BLE (S314).

The information processing device 200 that has received the polling command transmitted from the information processing device 100 in Step S314 gives a response corresponding to the polling command (S316).

The information processing device 100 that has received the response transmitted from the information processing device 200 in Step S316 reads key information stored in the recording medium such as the storage unit (not illustrated) (S318). Then, the information processing device 100 performs mutual authentication for accessing the secure recording medium included in the information processing device 200 using the key information (S320).

When the mutual authentication is completed in Step S320, the information processing device 100 transmits a data transmission request including a data transmission instruction, the data being stored in a secure area of the secure recording medium (S322). Here, the data transmission request of Step S322 corresponds to a data transmission request for causing information to be used in a process of NFC (an example of information to be used in a process to be performed in communication in the second communication scheme) to be transmitted.

The information processing device 200 that has received the data transmission request transmitted from the information processing device 100 in Step S322 reads data corresponding to the data transmission request from the secure recording medium and transmits the data to the information processing device 100 (S324).

The information processing device 100 that has received the data transmitted from the information processing device 200 in Step S324 determines whether or not the received data is desired data, and processes the received data in a case in which the received data is desired data (S326). By performing the process of Step S326, unlocking of the key of the door of the automobile illustrated with reference to FIG. 8B or the like is realized.

Here, the data transmitted from the information processing device 200 in Step S324 corresponds to information to be used in a process of NFC. Thus, the process of Step S326 corresponds to an example of a process using the information to be used in a process of NFC, i.e., a process performed using the information to be used in a process to be performed in communication in the second communication scheme. That is, the process of Step S326 corresponds to an example of the above-described process (2) (execution process).

In addition, in a case in which the received data is not desired data, the information processing device 100 does not process the received data and ends the process performed with the information processing device 200.

When the process performed with the information processing device 200 using the information to be used in a process of NFC ends, the information processing device 100 transmits a communication end request including an instruction to terminate communication based on BLE (S328).

The information processing device 200 that has received the communication end request from the information processing device 100 in Step S238 gives a response that communication based on BLE will be ended (S330).

The information processing device 100 that has received the response transmitted from the information processing device 200 in Step S330 deletes the information relating to pairing recorded in the recording medium in Step S312 from the recording medium (S332).

By performing the process illustrated in FIG. 12, for example, the use case according to the second example illustrated in FIG. 8B is realized.

Note that an example of a process that enables the use case according to the second example to be realized is not limited to the example illustrated in FIG. 12.

In a case in which the information processing device 200 moves out of a communicable range of BLE or the like and thus communication with the information processing device 200 based on BLE is not possible after the information processing device 100 performs authentication based on service type information in Step S306 of FIG. 12, for example, the information processing device 100 invalidates the authentication results obtained from authentication of the information processing device 200 in the process of Step S306, the process of Step S320, or the like.

In addition, in the case in which the data transmitted in Step S324 of FIG. 12 is received, the information processing device 100 can also cause data to be written in, for example, another area or the like of the secure recording medium included in the information processing device 200.

As the data to be written by the information processing device 100 in another area or the like of the secure recording medium, for example, various kinds of data that corresponds to a reward for the data transmitted in Step S324 such as data indicating a coupon, data for adding an electronic value, and the like are exemplified. Note that it is needless to say that data to be written by the information processing device 100 in another area or the like of the secure recording medium is not limited to the data corresponding to a reward for the data transmitted in Step S324.

In addition, even in a case in which either or both of a plurality of information processing devices 100 playing a role of Central in BLE and a plurality of information processing devices 200 100 playing a role of Peripheral in BLE are present, for example, one information processing device 100 and one information processing device 200 can perform a similar process (including a process according to a modified example) to that of FIG. 13 therebetween.

[3-2] Third Example of Use Case (Use Case Illustrated in FIG. 8C)

Next, a use case illustrated in FIG. 8C will be described as a third example of the use case.

[3-3-1] Overview of Use Case According to Third Example

In a case in which the process relating to the use case according to the first example introduced in [3-1] described above or the process relating to the use case according to the second example introduced in [3-2] described above is performed, for example, the key of a door of an automobile (an example of the information processing device 100; the same applies to the present use case below) is unlocked when an information processing terminal (an example of the information processing device 200; the same applies to the present use case below) enters the communicable range of BLE and thus the information processing terminal is detected as described above.

However, it is assumed that there is need that "adjustment for an individual, for example, adjustment of a position of a seat, adjustment of a position of a mirror, or the like, be performed when a user approaches an automobile closer or a predetermined action of a user is detected, even though a door of the automobile can be unlocked from a distance."

Thus, when BLE (an example of communication in the first communication scheme) with the information processing terminal is established, the automobile performs a process relating to adjustment for an individual on the basis of one or both of a determination result of a state of communication with the information processing terminal based on BLE and a determination result of a predetermine action performed by a user of the information processing terminal. Here, the "process based on a determination result of a state of communication with the information processing terminal based on BLE and a determination result of a predetermine action performed by a user of the information processing terminal" corresponds to "the execution process relating to the first example introduced in (a) described above", "the execution process relating to the second example introduced in (b) described above," or "a combined process of the execution process relating to the first example introduced in (a) described above and the execution process relating to the second example introduced in (b) described above."

[3-3-2] Process Relating to Use Case According to Third Example

FIG. 14 is an explanatory diagram illustrating an example of a process relating to a third use case to which the information processing method according to the present embodiment can be applied. FIG. 14 illustrates the example of the process of the information processing device 100 in a case in which communication in the first communication scheme is BLE. In addition, FIG. 14 illustrates the example of the process after BLE with a communication target device such as the information processing device 200 is established.

The information processing device 100 determines whether or not there are access and authentication with respect to a secure area of the secure recording medium of the information processing device 200 (S400). The information processing device 100 determines that there are access and authentication with respect to the secure area in a case in which, for example, such processes as Steps S224 and S226 of FIG. 10 are performed.

In a case in which it is determined that there are not access and authentication with respect to the secure area in Step S400, the information processing device 100 ends the process illustrated in FIG. 14.

In addition, in a case in which it is determined that there are access and authentication with respect to the secure area in Step S400, the information processing device 100 acquires communication strength of BLE (S402). The information processing device 100 acquires communication strength of BLE by measuring signal strength of a signal transmitted from the communication target device in BLE using, for example, an RSSI included in the information processing device 100, an external RSSI connected to the information processing device 100, or the like.

The information processing device 100 determines whether or not the acquired communication strength is greater than a predetermined threshold value (S404). Here, as the threshold value of Step S404, for example, a "fixed threshold value set in advance," a "variable threshold value that can be adjusted on the basis of a user operation or the like," or a "threshold value dynamically set using an algorithm for dynamically changing the threshold value on the basis of a measurement result of a pattern of the communication strength" is exemplified as described above.

In a case in which it is determined that the acquired communication strength is not greater than the predetermined threshold value in Step S404, the information processing device 100 ends the process illustrated in FIG. 14.

In addition, in a case in which it is determined that the acquired communication strength is greater than the predetermined threshold value in Step S404, the information processing device 100 executes authentication and access with respect to the secure area of the secure recording medium of the information processing device 200 (S406). The information processing device 100 performs the processes of, for example, Steps S224 and S226 of FIG. 10 in Step S406. Then, when data stored in the secure recording medium is acquired from the communication target device, the information processing device 100 performs, for example a similar process to that of Step S230 of FIG. 10, and performs a process using the data acquired from the communication target device.

In the case in which it is determined that the communication strength is greater than the predetermined threshold value, by performing the process illustrated in FIG. 14, for example, the information processing device 100 performs a process using the data stored in the secure recording medium acquired from the communication target device. Thus, by performing the process illustrated in FIG. 14, for example, the use case according to the third example illustrated FIG. 8C is realized.

Note that an example of a process for realizing the use case according to the third example is not limited to the example illustrated in FIG. 14.

For example, the information processing device 100 can perform a process in which the communication strength indicated in Steps S402 and S404 of FIG. 14 is replaced with a communication distance.

In addition, the information processing device 100 can also perform a process using the data stored in the secure recording medium acquired from the communication target device on the basis of a determination result of a predetermined action performed by the user of the communication target device, for example, instead of the processes of Steps S402 and S404 of FIG. 14. In the case in which the user of the communication target device is determined to have performed the predetermined action, for example, the information processing device 100 performs the process using the data stored in the secure recording medium acquired from the communication target device.

[3-4] Fourth Example of Use Case (Use Case Illustrated in FIG. 8D)

Next, as a fourth example of the use case, a use case illustrated in FIG. 8D will be described. The use case illustrated in FIG. 8D is an example of the use case in which the information processing device 200 performs the process relating to the other information processing method according to the present embodiment as described above.

[3-4-1] Overview of Use Case According to Fourth Example

For example, when an automobile (an example of the information processing device 100; the same applies to the present use case below) performs the above-described process (1) (communication establishment process) according to the information processing method according to the present embodiment, the automobile and an information processing terminal (an example of the information processing device 200; the same applies to the present use case below) establish BLE (an example of communication in the first communication scheme). In addition, the automobile and the information processing terminal can establish BLE using an arbitrary establishment method, for example, an establishment method based on a predetermined user operation such as an operation of a user for pairing, or the like.

However, it is assumed that there is need that "the automobile not be allowed to access data stored in a storage unit (which is not illustrated) of the information processing terminal or the like even in a case in which the information processing terminal is within a communicable range of BLE with the automobile after communication based on BLE is established."

Thus, when BLE (an example of communication in the first communication scheme) with the automobile is established, the information processing terminal blocks access from the automobile on the basis of one or both of a determination result of a state of communication of BLE with the automobile and a determination result of a predetermined action performed by a user of the information processing terminal. Here, the above-described "process based on one or both of a determination result of a state of communication of BLE with the automobile and a determination result of a predetermined action performed by a user of the information processing terminal" corresponds to any process of the process introduced in (i) described above to the process introduced in (iii) described above.

[3-4-2] Process Relating to Use Case According to Fourth Example

FIG. 15 is an explanatory diagram illustrating an example of a process relating to a fourth use case to which another information processing method according to the present embodiment can be applied. FIG. 15 illustrates the example of the process of the information processing device 200 in a case in which communication in the first communication scheme is BLE. In addition, FIG. 15 illustrates the example of the process after BLE with a communication target device such as the information processing device 100 is established.

The information processing device 200 determines whether or not there are access and authentication with respect to a secure area of a secure recording medium thereof (S500). In a case in which such a data transmission request as shown in Step S226 of FIG. 10 is acquired, for example, the information processing device 200 determines that there are access and authentication with respect to the secure area.

In a case in which it is determined that there are not access and authentication with respect to the secure area in Step S500, the information processing device 100 ends the process illustrated in FIG. 15.

In addition, in a case in which it is determined that there are access and authentication with respect to the secure area in Step S500, the information processing device 200 acquires communication strength of BLE (S502). The information processing device 200 acquires communication strength of BLE by measuring signal strength of a signal transmitted from the communication target device in BLE using, for example, an RSSI included in the information processing device 100, an external RSSI connected to the information processing device 200, or the like.

The information processing device 200 determines whether or not the acquired communication strength is greater than a predetermined threshold value (S504). Here, as the threshold value of Step S504, for example, a "fixed threshold value set in advance," a "variable threshold value that can be adjusted on the basis of a user operation or the like," or a "threshold value dynamically set using an algorithm for dynamically changing the threshold value on the basis of a measurement result of a pattern of the communication strength" is exemplified as described above.

In a case in which it is determined that the acquired communication strength is not greater than the predetermined threshold value in Step S504, the information processing device 200 ends the process illustrated in FIG. 15.

In addition, in a case in which it is determined that the acquired communication strength is greater than the predetermined threshold value in Step S504, the information processing device 200 executes authentication and access with respect to the secure area of the secure recording medium (S506). Then, the information processing device 200 transmits data read from the secure recording medium as in Step S228 of FIG. 10, for example, to the communication target device.

By performing the process illustrated in FIG. 15, for example, in the case in which it is determined that the communication strength is greater than the predetermined threshold value, the information processing device 200 performs a process on the basis of a request such as a data transmission request acquired from the communication target device. Thus, the use case according to the fourth example as illustrated in FIG. 8D is realized by performing, for example, the process illustrated in FIG. 15.

Note that an example of a process that enables the use case according to the fourth example to be realized is not limited to the example illustrated in FIG. 15.

For example, the information processing device 200 can perform a process in which the communication strength indicated in Steps S502 and S504 of FIG. 15 is replaced with a communication distance.

In addition, the information processing device 200 can also selectively perform the process based on the request such as the data transmission request acquired from the communication target device on the basis of a determination result of a predetermined action performed by a user of the information processing device 200, for example, instead of the processes of Steps S502 and S504 of FIG. 15. In a case in which the user of the information processing device 200 is determined to have performed the predetermined action, for example, the information processing device 200 does not perform the process based on the request such as the data transmission request acquired from the communication target device.

As use cases to which the information processing method according to the present embodiment described above and the other information processing method according to the present embodiment described above can be applied, for example, the use case according to the first example introduced in [3-1] described above to the use case according to the fourth example introduced in [3-4] described above are exemplified.

Note that use cases to which the information processing method according to the present embodiment described above and the other information processing method according to the present embodiment described above can be applied are not limited to the use case according to the first example introduced in [3-1] described above to the use case according to the fourth example introduced in [3-4] described above.

For example, as use cases to which the information processing method according to the present embodiment described above and the other information processing method according to the present embodiment described above can be applied, various use cases, for example, use cases described below, and the like, are exemplified.

Examination of tickets at public transportation stations (in this use case, for example, a ticket gate, a server connected thereto, or the like corresponds to the information processing device 100, and a device carried by a user such as a smartphone or a wearable device corresponds to the information processing device 200)

Purchasing at stores (in this use case, for example, a point-of-sale (POS) device installed at a store, a server connected thereto, or the like corresponds to the information processing device 100, and a device carried by a user such as a smartphone or a wearable device corresponds to the information processing device 200)

Entry control (in this use case, for example, a device provided at a gate, a server connected thereto, or the like corresponds to the information processing device 100, and a device carried by a user such as a smartphone or a wearable device corresponds to the information processing device 200)

Access control to computer (in this use case, for example, a computer that is subject to access control, a server connected thereto, or the like corresponds to the information processing device 100, and a device carried by a user such as a smartphone or a wearable device corresponds to the information processing device 200)

(Program According to Present Embodiment)

[I] Program Relating to Information Processing Method According to Present Embodiment With a program for causing a computer to function as the information processing device 100 according to the present embodiment (or a modified example of the information processing device 100) (e.g., a program that can execute a process relating to the information processing method according to the present embodiment, such as "the above-described process (1) (communication establishment process)," "the above-described process (1) (communication establishment process) and the above-described process (2) (execution process)"), or the like executed by a processor or the like of the computer, a communication target device can be authenticated using a combination of different communication scheme and communication with the communication target device in one communication scheme can be established.

In addition, with the program for causing a computer to function as the information processing device 100 according to the present embodiment (or a modified example of the information processing device 100) executed by a processor of the computer or the like, the effects exhibited through the process relating to the information processing method according to the present embodiment described above can be exhibited.

[II] Program Relating to the Other Information Processing Method According to the Present Embodiment With a program for causing a computer to function as the information processing device 200 according to the present embodiment (or a modified example of the information processing device 200) (e.g., a program that can execute the process relating to the other information processing method according to the present embodiment such as "the above-described process (I) (execution control process)) executed by a processor of the computer or the like, access from a communication target device such as the information processing device 100 playing a role of Central can be blocked, for example, even after pairing.

In addition, by a processor or the like executing the program for causing a computer to function as the information processing device 200 according to the present embodiment (or a modified example of the information processing device 200) using in the computer, the effects obtained by performing the process relating to another information processing method according to the above-described present embodiment can be exhibited.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the provision of the program (a computer program) for causing a computer to function as the information processing device 100 according to the present embodiment (or a modified example of the information processing device 100) has been introduced above, for example, a recording medium having the above-described program stored therein can also be provide together in the present embodiment.

In addition, although the provision of the program (a computer program) for causing a computer to function as the information processing device 200 according to the present embodiment (or a modified example of the information processing device 200) has been introduced above, a recording medium having the above-described program stored therein can also be provide together in the present embodiment.

The above-described configuration shows an example of the present embodiment and of course belongs to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a processing unit configured to authenticate a communication target device on a basis of predetermined information transmitted from the communication target device by broadcast in communication in a first communication scheme, the predetermined information being used in a process to be performed in communication in a second communication scheme that is different from the first communication scheme, and establish the communication with the communication target device in the first communication scheme in a case in which authentication is completed.

(2)

The information processing device according to (1), in which the predetermined information is identification information indicating a device, and the processing unit authenticates the communication target device on a basis of the identification information.

(3)

The information processing device according to (1) or (2), in which the predetermined information is service type information indicating a service, and the processing unit authenticates the communication target device on a basis of the service type information.

(4)

The information processing device according to any one of (1) to (3), in which, when the communication with the communication target device in the first communication scheme is established, the processing unit performs a process using information to be used in the process to be performed in the communication in the second communication scheme through the communication established with the communication target device in the first communication scheme.

(5)

The information processing device according to (4), in which the processing unit determines a state of the communication with the communication target device in the first communication scheme, acquires information stored in a secure recording medium from the communication target device as the information to be used on a basis of a determination result, and performs a process using the acquired information stored in the secure recording medium.

(6)

The information processing device according to (5), in which the state of the communication in the first communication scheme is communication strength of the communication in the first communication scheme, and the processing unit acquires the information stored in the secure recording medium from the communication target device in a case in which the communication strength has a value greater than a predetermined threshold value or a case in which the communication strength has a value greater than or equal to the predetermined threshold value.

(7)

The information processing device according to (5) or (6), in which the state of the communication in the first communication scheme is a communication distance of the communication in the first communication scheme, and the processing unit acquires the information stored in the secure recording medium from the communication target device in a case in which the communication distance has a value smaller than a predetermined threshold value or a case in which the communication distance has a value equal to or smaller than the predetermined threshold value.

(8)

The information processing device according to any one of (4) to (7), in which the processing unit determines a predetermined action performed by a user of the communication target device, acquires information stored in a secure recording medium from the communication target device as the information to be used on a basis of a determination result, and performs a process using the acquired information stored in the secure recording medium.

(9)

The information processing device according to any one of (4) to (8), in which, in a case in which a plurality of communication target devices that have established the communication in the first communication scheme are present, the processing unit performs a process using information to be used in the process to be performed in the communication in the second communication scheme through the communication established with each of the plurality of communication target devices in the first communication scheme (10)

The information processing device according to (9), in which the processing unit changes a process to be executed on a basis of a combination of the information to be used acquired from each of the plurality of communication target devices.

(11)

The information processing device according to any one of (1) to (10), in which the communication in the second communication scheme has a shorter communicable distance than the communication in the first communication scheme.

(12)

An information processing method executed by an information processing device, the information processing method including:

a step of authenticating a communication target device on a basis of predetermined information transmitted from the communication target device by broadcast in communication in a first communication scheme, the predetermined information being used in a process to be performed in communication in a second communication scheme that is different from the first communication scheme, and establishing the communication with the communication target device in the first communication scheme in a case in which authentication is completed.

(13)

A program for causing a computer to realize a function of authenticating a communication target device on a basis of predetermined information transmitted from the communication target device by broadcast in communication in a first communication scheme, the predetermined information being used in a process to be performed in communication in a second communication scheme that is different from the first communication scheme, and establishing the communication with the communication target device in the first communication scheme in a case in which authentication is completed.

(14)

An information processing device including:

a processing unit configured to determine a state of communication with a communication target device when communication with the communication target device is established and not to perform a process based on a request transmitted from the communication target device on a basis of a determination result.

(15)

The information processing device according to (14), in which the state of the communication is communication strength of the communication, and the processing unit does not perform the process based on the request transmitted from the communication target device in a case in which the communication strength has a value smaller than a predetermined value or in a case in which the communication strength has a value equal to or smaller than the predetermined threshold value.

(16)

The information processing device according to (14) or (15), in which the state of the communication is a communication distance of the communication, and the processing unit does not perform the process based on the request transmitted from the communication target device in a case in which the communication distance has a value greater than a predetermined threshold value or in a case in which the communication distance has a value greater than or equal to the predetermined threshold value.

REFERENCE SIGNS LIST 100, 200 information processing device
102, 202 first communication unit
104, 204 second communication unit
106, 206 control unit
110, 210 processing unit

The invention claimed is:

1. An information processing device, comprising:
a processing unit configured to:
receive first information from a communication target device;
authenticate the communication target device based on the first information;
establish a communication between the information processing device and the communication target device based on the authentication of the communication target device;
execute a first process based on the first information and the establishment of the communication between the information processing device and the communication target device;
determine a state of the communication between the information processing device and the communication target device,
wherein the state of the communication corresponds to a communication strength of the communication between the information processing device and the communication target device;
acquire second information from the communication target device based on a value of the communication strength that is one of greater than or equal to a first threshold value; and
execute a second process based on the acquired second information.

2. The information processing device according to claim 1, wherein
the first information is identification information which indicates a specific device associated with the communication target device, and
the processing unit is further configured to authenticate the communication target device based on the identification information.

3. The information processing device according to claim 1, wherein
the first information is service type information which indicates a specific service, and the processing unit is further configured to authenticate the communication target device based on the service type information.

4. The information processing device according to claim 1, wherein
the state of the communication further corresponds to a communication distance between the information processing device and the communication target device,
the processing unit is further configured to acquire the second information from the communication target device based on a value of the communication distance, and
the value of the communication distance is one of smaller than or equal to a second threshold value.

5. The information processing device according to claim 1, wherein the processing unit is further configured to:
determine a specific user action that corresponds to the communication target device;
acquire specific information from the communication target device as the first information based on the determined specific user action; and
execute the second process based on the acquired specific information.

6. An information processing method, comprising:
in an information processing device:
receiving first information from a communication target device;
authenticating the communication target device based on the first information;
establishing a communication between the information processing device and the communication target device based on the authentication of the communication target device;
executing a first process based on the first information and the establishment of the communication between the information processing device and the communication target device;
determining a state of the communication between the information processing device and the communication target device,
wherein the state of the communication corresponds to a communication strength of the communication between the information processing device and the communication target device;
acquiring second information from the communication target device based on a value of the communication strength that is one of greater than or equal to a specific threshold value; and
executing a second process based on the acquired second information.

7. The information processing method according to claim 6, wherein
the first information is identification information which indicates a specific device associated with the communication target device, and
the authentication of the communication target device is based on the identification information.

8. The information processing method according to claim 6, wherein
the first information is service type information which indicates a specific service, and
the authentication of the communication target device is based on the service type information.

9. The information processing method according to claim 6, further comprising:
determining a specific user action that corresponds to the communication target device;

acquiring specific information from the communication target device as the first information based on the determined specific user action; and executing the second process based on the acquired specific information.

10. A non-transitory computer-readable medium having stored thereon computer-executable instructions that, when executed by a processor, cause the processor to execute operations, the operations comprising:

receiving first information from a communication target device;

authenticating the communication target device based on the first information;

establishing a communication between an information processing device and the communication target device based on the authentication of the communication target device;

executing a first process based on the first information and the establishment of the communication between the information processing device and the communication target device;

determining a state of the communication between the information processing device and the communication target device, wherein the state of the communication corresponds to a communication strength of the communication between the information processing device and the communication target device;

acquiring second information from the communication target device based on a value of the communication strength that is one of greater than or equal to a specific threshold value; and executing a second process based on the acquired second information.

11. The non-transitory computer-readable medium according to claim 10, wherein the first information is identification information which indicates a specific device associated with the communication target device, and the authentication of the communication target device is based on the identification information.

12. The non-transitory computer-readable medium according to claim 10, wherein the first information is service type information which indicates a specific service, and the authentication of the communication target device is based on the service type information.

13. The non-transitory computer-readable medium according to claim 10, the operations further comprising:

determining a specific user action that corresponds to the communication target device;

acquiring specific information from the communication target device as the first information based on the determined specific user action; and executing the second process based on the acquired specific information.

* * * * *